United States Patent
Robins et al.

(10) Patent No.: US 8,880,801 B1
(45) Date of Patent: Nov. 4, 2014

(54) TECHNIQUES FOR RELIABILITY AND AVAILABILITY ASSESSMENT OF DATA STORAGE CONFIGURATIONS

(75) Inventors: Edward S. Robins, Winchester, MA (US); Sergey Rytenkov, St. Petersburg (RU); Hagay Dagan, Pardes Hanna-Karkur (IL); Dan Aharoni, Brookline, MA (US); Kevin E. Granlund, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 514 days.

(21) Appl. No.: 13/200,658

(22) Filed: Sep. 28, 2011

(51) Int. Cl.
*G06F 12/02* (2006.01)
*G06F 11/00* (2006.01)

(52) U.S. Cl.
USPC ............. 711/114; 711/170; 711/E12.001; 714/1; 714/6.22

(58) Field of Classification Search
None
See application file for complete search history.

(56) References Cited

U.S. PATENT DOCUMENTS

| | | | |
|---|---|---|---|
| 7,730,363 B2 * | 6/2010 | Takezawa et al. | 714/47.1 |
| 7,822,939 B1 | 10/2010 | Veprinsky et al. | |
| 2004/0230317 A1 * | 11/2004 | Kumar et al. | 700/1 |
| 2009/0070541 A1 | 3/2009 | Yochai | |
| 2010/0257306 A1 * | 10/2010 | Kawaguchi | 711/103 |

* cited by examiner

*Primary Examiner* — Denise Tran
(74) *Attorney, Agent, or Firm* — Muirhead and Saturnelli, LLC

(57) ABSTRACT

Described are techniques for selecting a storage pool configuration. A set of one or more candidate storage pool configurations is determined. For each of the candidate storage pool configurations of the set, a reliability calculation is performed to determine a reliability value indicating reliability of the candidate storage pool configuration. For each of the candidate storage pool configurations of the set, an availability calculation is performed to determine an availability value indicating availability of the candidate storage pool configuration. In accordance with selection criteria, one of the candidate storage pool configurations of the set for a first storage pool is selected. The selection criteria includes the availability value and the reliability value for each of the plurality of candidate storage pool configurations.

19 Claims, 20 Drawing Sheets

| Number of Pools | 1 | | | | | | | | | | CALCULATE |
|---|---|---|---|---|---|---|---|---|---|---|---|
| Drive | RAID | System Quantity | System Capacity TB | % of Drive Type | LUN Size GB/Drive (max. Drive Size) | Required RAID Drive QTY | Per Pool Physical Capacity TB | Per Pool Logical Capacity TB | Unreliability/ Risk | Unavailability | Availability | Risk Rank | % of Pool |
| 450G/15K | R1 | 360 | 16 | 50% | 300 | 160 | 54 | 27 | 4.55E-05 | 2.75E-08 | 0.999999972 | 3 | 19.1% |
| 3T/7k | 3R5 | 720 | 2,160 | 31% | 950 | 224 | 213 | 160 | 8.37E-03 | 9.04E-05 | 0.999909583 | 1 | 75.2% |
| 400G EFD | 7R5 | 64 | 26 | 100% | 250 | 64 | 16 | 14 | 1.41E-04 | 7.01E-08 | 0.999999930 | 2 | 5.7% |
| No Drive | Not assigned | | Undefined | 100% | 100 | | | N/A | 0.00E+00 | 0.00E+00 | 1.000000000 | | |
| Cumulative Values: | | 1144 | 2,202 | | | 468 | 283 | 201 | 0.853647% | | | | 100.0% |
| | | | | | | | | Net Risk | 0.853647% | | | | |
| | | | | | | | | Availability Nines | 4 | | | | |

| Number of Pools | 1 | | | | | | | | | | CALCULATE |
|---|---|---|---|---|---|---|---|---|---|---|---|
| Drive | RAID | System Quantity | System Capacity TB | % of Drive Type | LUN Size GB/Drive (max. Drive Size) | Required RAID Drive QTY | Per Pool Physical Capacity TB | Per Pool Logical Capacity TB | Unreliability/ Risk | Unavailability | Availability | Risk Rank | % of Pool |
| 450G/15K | R1 | 360 | 16 | 50% | 300 | 160 | 54 | 27 | 4.57E-05 | 2.75E-08 | 0.999999972 | 3 | 19.1% |
| 3T/7k | 6R6 | 720 | 2,160 | 51% | 880 | 368 | 213 | 160 | 6.56E-05 | 1.85E-08 | 0.999999148 | 2 | 75.3% |
| 400G EFD | 7R5 | 64 | 26 | 100% | 250 | 64 | 16 | 14 | 1.41E-04 | 7.01E-08 | 0.999999930 | 1 | 5.6% |
| No Drive | Not assigned | | Undefined | 100% | 100 | | | N/A | 0.00E+00 | 0.00E+00 | 1.000000000 | | |
| Cumulative Values: | | 1144 | 2,202 | | | 612 | 283 | 201 | 0.025228% | | | | 100.0% |
| | | | | | | | | Net Risk | 0.025228% | | | | |
| | | | | | | | | Availability Nines | 5 | | | | |

FIG. 13

TECHNIQUES FOR RELIABILITY AND AVAILABILITY ASSESSMENT OF DATA STORAGE CONFIGURATIONS

BACKGROUND

1. Technical Field

This application generally relates to data storage, and more particularly to techniques used in connection with data storage configurations.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method of selecting a storage pool configuration comprising determining a set of one or more candidate storage pool configurations; performing, for each of the candidate storage pool configurations of the set, a reliability calculation to determine a reliability value indicating reliability of said each candidate storage pool configuration; performing, for each of the candidate storage pool configurations of the set, an availability calculation to determine an availability value indicating availability of said each candidate storage pool configuration; and selecting, in accordance with selection criteria, one of the candidate storage pool configurations of the set for a first storage pool, said selection criteria including said availability value and said reliability value for each of said plurality of candidate storage pool configurations. The selection criteria may include any of performance and cost. The step of selecting may also include determining that said reliability value for said one candidate storage pool configuration represents a level of storage pool reliability that is greater than an acceptable reliability threshold; and determining that said availability value for said one candidate storage pool configuration represents a level of storage pool availability that is greater than an acceptable availability threshold. Each of the one or more candidate storage pool configurations may include one or more RAID group configurations, each of said one or more RAID group configurations including a plurality of physical storage devices of one of a plurality of different types of storage media. The plurality of different types of storage media may include solid state storage device media and one or more types of different rotating disk media. The one candidate storage pool configuration may include a plurality of RAID groups, and the method may further include determining, for each portion of said plurality of RAID groups having a same type of storage media, a first availability value indicating a combined availability for said each portion; and determining a storage pool availability indicating an availability for said one candidate storage pool based on one or more of said first availability values. A first RAID group in said each portion may include physical storage devices of a first type of storage media having a first RAID group configuration and first RAID protection level and a second RAID group in said each portion includes physical storage devices of the first type of storage media having a second RAID group configuration and a second RAID protection level. The first RAID protection level may differ from said second RAID protection level and/or said first RAID group configuration may differ from the second RAID group configuration. The one candidate storage pool configuration may include a plurality of RAID groups, and the method may further include determining, for each portion of said plurality of RAID groups having a same type of storage media, a first reliability value indicating a combined reliability for said each portion; and determining a storage pool reliability indicating a reliability for said one candidate storage pool based on one or more of said first reliability values. The first storage pool may have a first storage pool availability and a first storage pool reliability, and wherein a second storage pool may have a second storage pool availability and a second storage pool reliability. The method may also include determining, using said first storage pool availability and said second storage pool availability, a net availability indicating a combined availability for said first storage pool and said second storage pool; and determining whether said net availability represents a level of availability that is greater than an acceptable availability threshold. The method may also include determining, using said first storage pool reliability and said second storage pool reliability, a net reliability indicating a combined reliability for said first storage pool and said second storage pool; and determining whether said net reliability represents a level of reliability that is greater than an acceptable reliability threshold. If either said net reliability is not greater than the acceptable reliability threshold or said net availability is not greater than the acceptable availability threshold, it may be determined that a combination of currently select storage pool configurations for the first storage pool and the second storage pool are unacceptable. If the net availability is not greater than the acceptable availability threshold, the method may further include partitioning said second storage pool into a plurality of smaller storage pools; determining a small storage pool availability for each of said plurality of smaller storage pools; determining a combined small pool availability using a plurality of small storage pool availabilities for said plurality of smaller storage pools; determining, using said combined small pool availability and said first storage pool availability, a revised net availability indicating a combined availability for said first storage pool and said plurality of smaller storage pools; and determining whether said revised net availability represents a level of availability that is greater than an acceptable availability threshold. If the net reliability is not greater than the acceptable reliability threshold, the method may further include selecting one of said plurality of different types of storage media of drives included in a first RAID group of any of the first storage pool and the second storage pool; selecting a revised RAID configuration providing an increased level of protection in comparison to a current RAID configuration for the first RAID group; updating any of said first storage pool reliability and said second storage pool reliability in accordance with said revised RAID configuration; determining a revised net reliability using the first storage pool reliability and the second storage pool reliability; and determining whether said revised net availability represents a level of availability that is greater than an acceptable availability threshold. Performing an availability calculation for a first of the candidate storage pool configurations of the set may include determining a first time to restore data for said first candidate pool configuration upon an occurrence of a failure of any RAID group in said first candidate storage pool configuration thereby indicating that the failing RAID group is unable to recover desired data using RAID-group internal rebuild processes, and a second time to rebuild data for a first RAID group in said first candidate storage pool configuration upon an occurrence of an internal RAID group failure of the first RAID group where the first RAID group is able to recover desired data using RAID-group internal rebuild processes for the first RAID group. The second time to rebuild may be determined in accordance with one or more factors including any of performance characteristics of physical drives of the first candidate storage pool configuration, workload of a data storage system directed to the first RAID group when performing said RAID-group internal rebuild processes for the first RAID group, physical location and/or availability of a spare device used in connection with performing said RAID-group internal rebuild processes for the first RAID group, a service level factor affecting an amount of time to obtain a resource in connection with performing said RAID-group internal rebuild processes, a RAID level and RAID group configuration indicated in the first candidate storage pool configuration of physical drives of the first RAID group, a priority to performing processing of incoming I/O operations over other processing of the RAID-group internal rebuild, and a rate factor related to a rate at which a particular software version is able to perform rebuild processing wherein said rate factor varies with software version. The first time to restore may be determined in accordance with one or more factors including any of a service level factor affecting an amount of time to obtain a resource in connection with performing data restoration processing to restore data for said first candidate pool configuration, physical location of a backup data set used in connection with performing data restoration processing to restore data for said first candidate pool configuration, a type of data restoration process performed in connection with restoring data for said first candidate pool configuration, and a physical location and/or availability of a spare device. The reliability calculation and said availability calculation may be based on probabilities determined in accordance with a time-dependent model using time-dependent Markov solutions and said first storage pool may be a pool used to provision storage for virtually provisioned devices wherein each of said virtually provisioned devices has a capacity and an amount of storage allocated for each virtually provisioned devices at a point in time is less than the capacity. The method may also include providing a user interface that displays, for a storage pool including a set of physical drives of a particular type, different combinations of reliability and availability in accordance with different storage pool configurations for the storage pool. The different storage pool configurations may be based on a RAID level, a RAID group configuration for the RAID level, and total storage capacity of the set of physical drives in the storage pool. For each of the different storage pool configurations, a first visual indicator may indicate availability of the storage pool in said each different storage pool configuration and a second visual indicator may indicate reliability of the storage pool in said each different storage pool configuration, said first visual indicator being displayed to overlay said second visual indicator on a display area. Performing a reliability calculation for a first of the candidate storage pool configurations of the set may include determining a time to rebuild data for a first RAID group in said first candidate storage pool configuration upon an occurrence of an internal RAID group failure of the first RAID group where the first RAID group is able to recover desired data using RAID-group internal rebuild processes for the first RAID group and wherein said time to rebuild is determined in accordance with one or more factors including any of performance characteristics of physical drives of the first candidate storage pool configuration, workload of a data storage system directed to the first RAID group when performing said RAID-group internal rebuild processes for the first RAID group, physical location and/or availability of a spare device used in connection with performing said RAID-group internal rebuild processes for the first RAID group, a service level factor affecting an amount of time to obtain a resource in connection with performing said RAID-group internal rebuild processes, and a RAID level and RAID group configuration indicated in the first candidate storage pool configuration of physical drives of the first RAID group.

In accordance with another aspect of the invention is a computer readable medium comprising code stored thereon for selecting a configuration for a storage pool, the computer readable medium comprising code for determining a set of one or more candidate storage pool configurations; performing, for each of the candidate storage pool configurations of the set, a reliability calculation to determine a reliability value indicating reliability of said each candidate storage pool configuration; performing, for each of the candidate storage pool configurations of the set, an availability calculation to determine an availability value indicating availability of said each candidate storage pool configuration; and selecting, in accordance with selection criteria, one of the candidate storage pool configurations of the set for a first storage pool, said selection criteria including said availability value and said reliability value for each of said plurality of candidate storage pool configurations.

BRIEF DESCRIPTION OF THE DRAWINGS

Features and advantages of the present invention will become more apparent from the following detailed description of exemplary embodiments thereof taken in conjunction with the accompanying drawings in which:

FIGS. 13, 14 and 15 are examples of user interfaces that may be used in an embodiment in accordance with techniques herein.

DETAILED DESCRIPTION OF EMBODIMENT(S)

Figure 1:
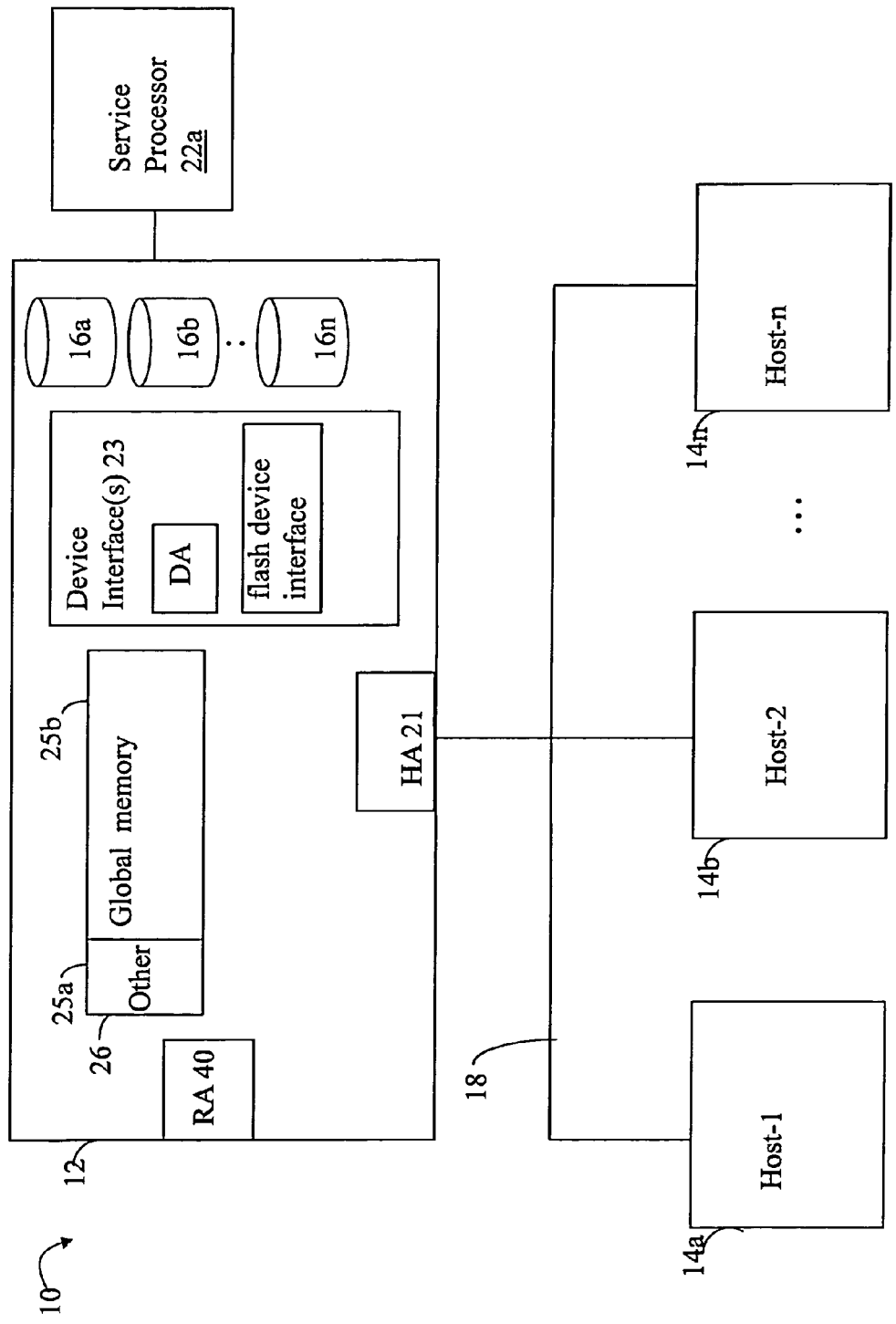
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard disk drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12. The service processor 22a may be used to store performance data that can be queried for use in determining various values for use with techniques herein such as, for example, in connection with rebuilding and restoration as described elsewhere herein.

Figure 2:
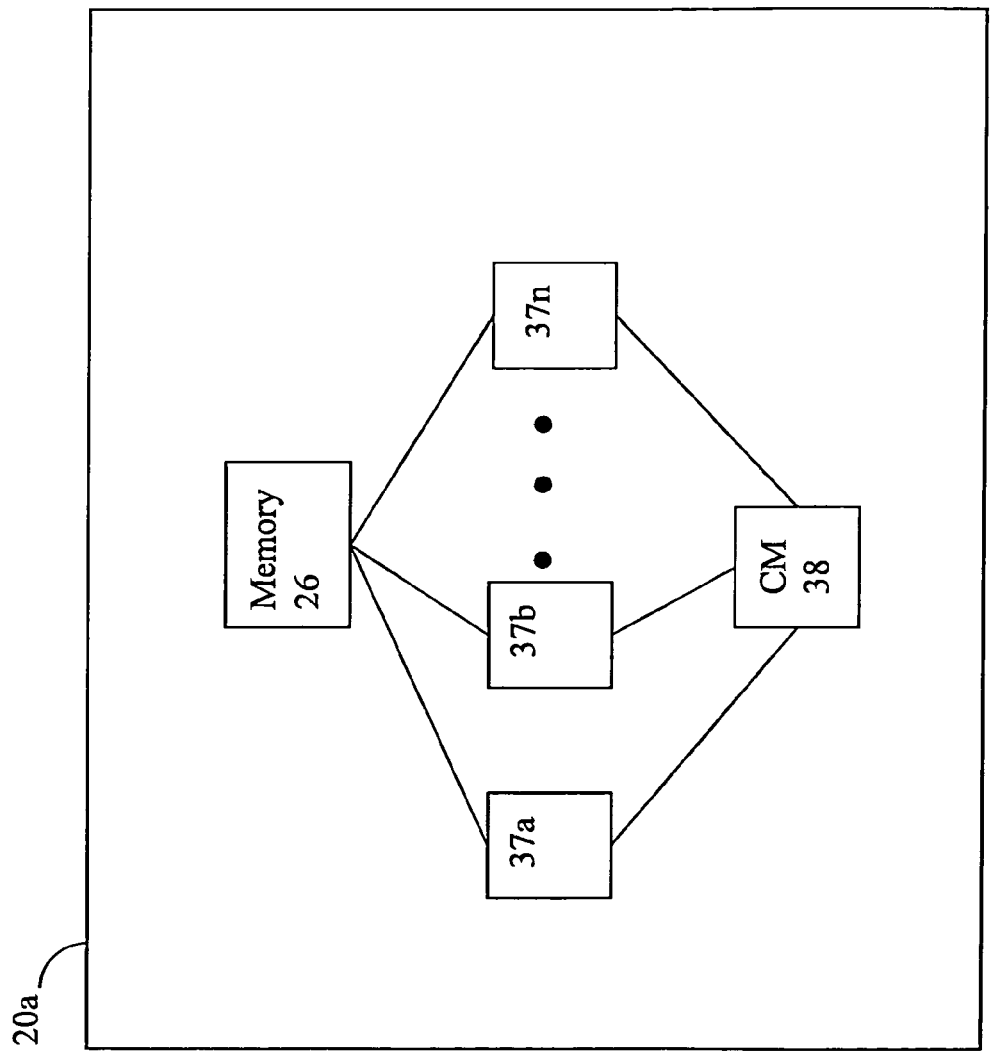
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any kind of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. Storage devices may have specific wearout modes that may be taken into account in connection with techniques described herein An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage technology, a type of data protection, device performance characteristic(s), storage capacity, and the like. The storage technology may specify whether a physical storage device is an SSD drive (such as a flash drive), a particular type of SSD drive (such using flash or a form of RAM), a type of magnetic disk or other non-SSD drive (such as an FC drive, a SATA (Serial Advanced Technology Attachment) drive), and the like. Data protection may specify a type or level of data storage protection such, for example, as a particular RAID level and associated RAID configuration (e.g., RAID1, RAID-5 with a 3+1 (3 data, 1 parity) configuration, RAID5 with a 7+1 configuration, and the like). Performance characteristics may relate to different performance aspects of the physical storage devices of a particular technology. For example, there may be multiple FC rotating disk drives based on the RPM characteristics of the FC rotating disk drives (e.g., 10K RPM FC drives and 15K RPM FC drives) and FC drives having different RPM characteristics may be included in different storage tiers. Storage capacity may specify the amount of data, such as in bytes, that may be stored on a single drive. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC disk drives, and a third tier of all SATA disk drives. The foregoing are some examples of tier definitions and other tier definitions may be specified in accordance with techniques herein.

Figure 3:
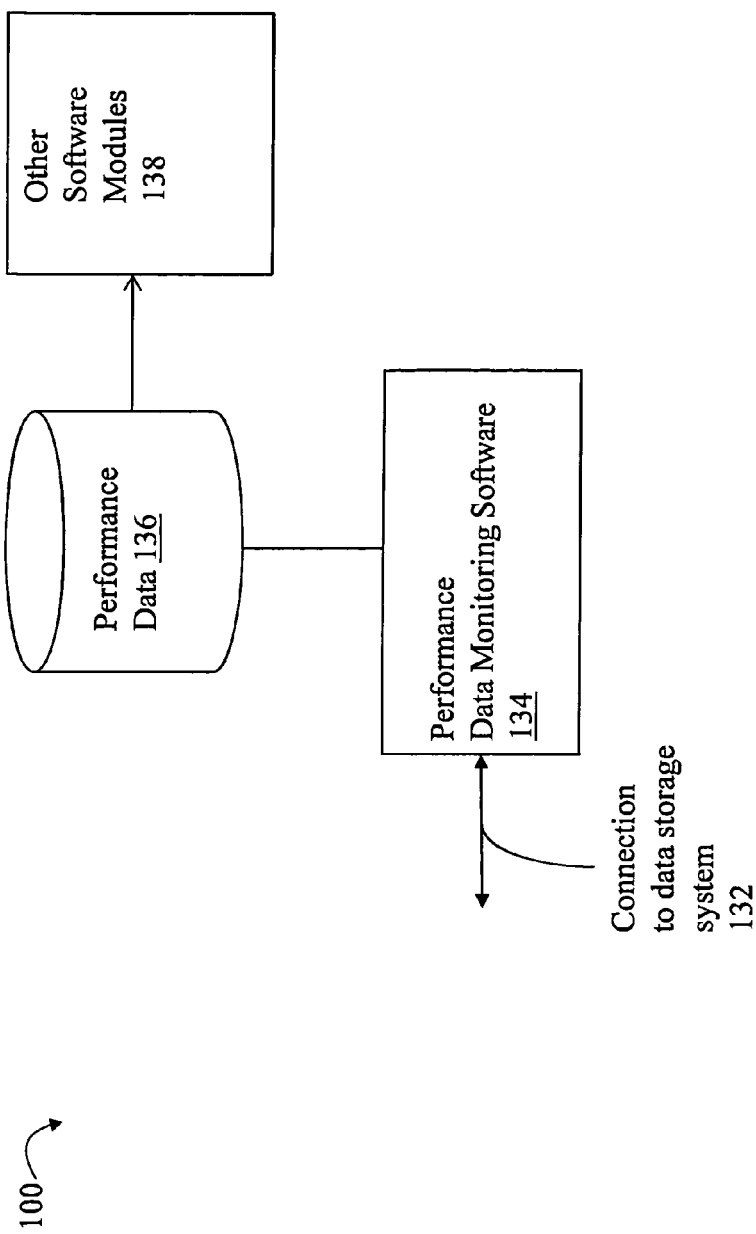
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a 14n.

Included in the service processor 22a is performance data monitoring software 134 which gathers performance data about the data storage system 12 through the connection 132. The performance data monitoring software 134 gathers and stores performance data which may be stored in the performance data file 136. This performance data 136 may also serve as an input to one or more other software modules or components 138 that perform processing in connection with techniques herein. For example, the performance data 136 may be used by one or more other modules 138 to obtain metrics described and used in connection with techniques herein for determining a current workload of the data storage system, one or more physical devices or drives, one or more logical devices or volumes (LVs), a storage pool, and the like. The workload, as may be determined based on one or more performance-related metrics, may also be characterized as a measurement or level of "how busy" a device, or portion thereof is, for example, in terms of I/O operations (e.g., I/O throughput such as number of I/Os/second, and the like).

It should be noted that the operations of read and write with respect to an LV, thin device, and the like, may be viewed as read and write requests or commands from the DA, controller or other backend physical device interface. Thus, these operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

As set forth in following paragraphs, described are techniques that may be used in connection with performing an assessment of a data storage configuration, such as for one or more storage pools, in accordance with one or more criteria where such criteria may include risk or reliability, availability, performance, and cost. Such an assessment may be used in connection with selecting a particular configuration for one or more storage pools from multiple candidate storage configuration based on the desired criteria. Such an assessment may be performed in connection with one or more storage pools of devices used in connection with virtual or thin provisioning. As described in more detail in following paragraphs, a thin device may be characterized as logical device providing virtual provisioning that allows more storage capacity to be presented to a host, or an application thereon, than is physically available. Virtual provisioning in connection with thin devices may provide for allocating underlying physical storage for the thin device only when the storage is actually written to. Although the techniques herein may be used in connection with storage pools of virtually provisioned thin devices, it will be appreciated that techniques herein may more generally be used in connection with performing such an assessment in connection with other types of storage pools.

Figure 4:
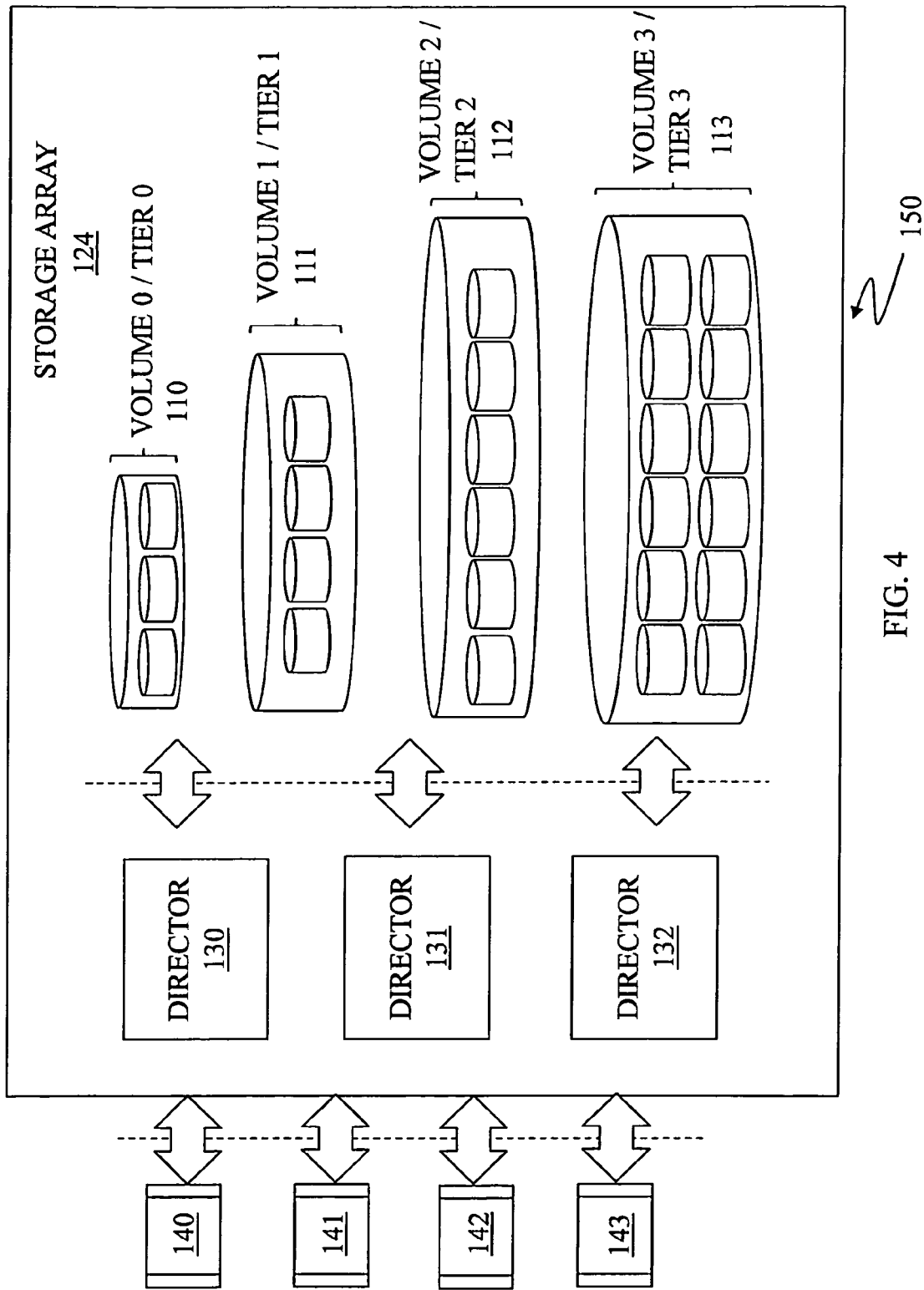
FIGS. 4, 5A and 5B are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics as described elsewhere herein. As described above, a tier may represent a set of storage resources, such as physical storage devices, residing in a storage platform. Examples of storage disks that may be used as storage resources within a storage array of a tier may include sets SATA disks, FC disk disks and/or EFDs, among other known technologies of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically and/or manually moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage.

Figure 5A:
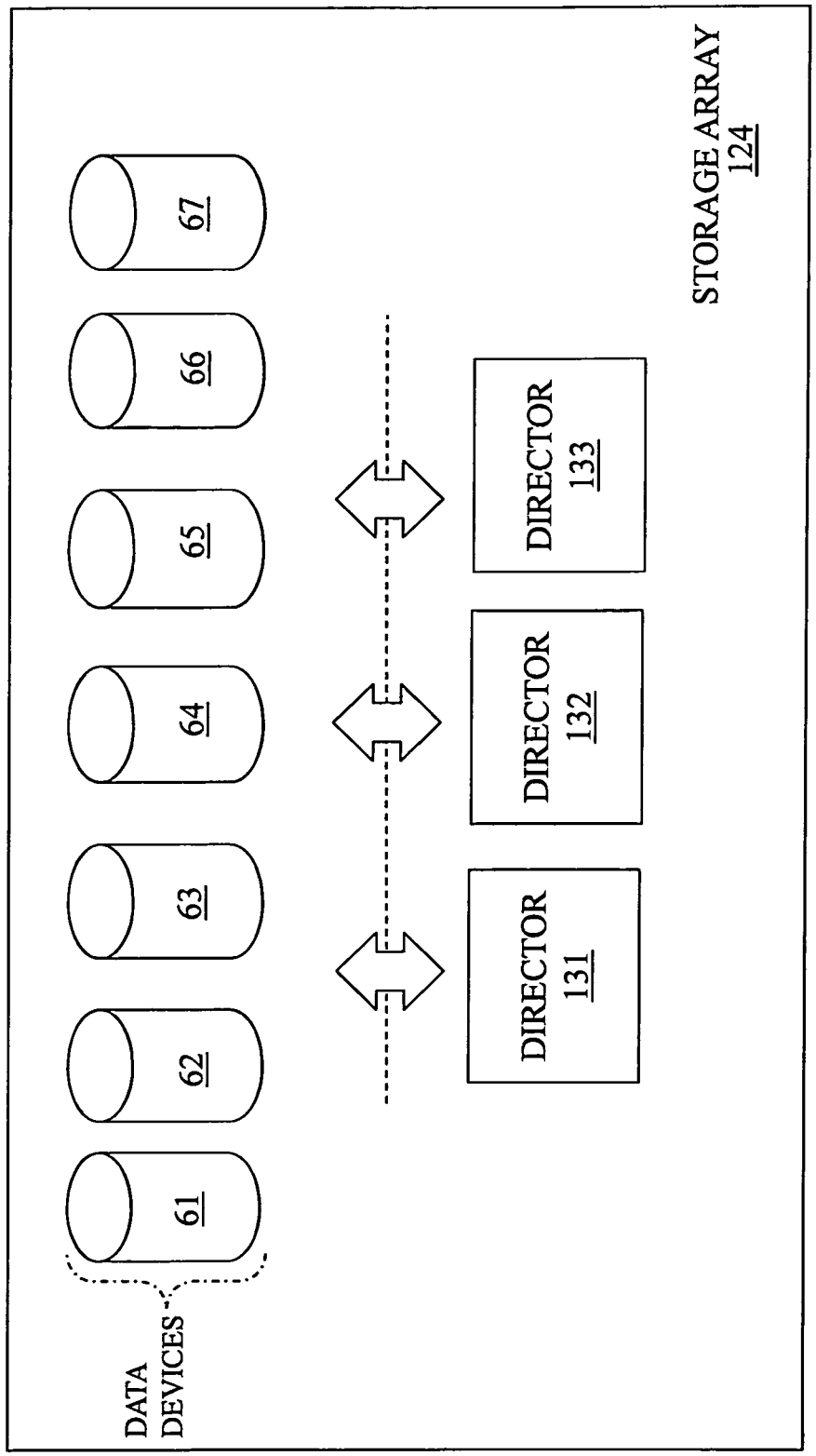

Referring to FIG. 5A, shown is a schematic diagram of the data storage array 124 as including a plurality of data devices 61-67 communicating with directors 131-133. The data devices 61-67 may be implemented as logical devices like standard logical devices (also referred to as thick devices) provided in a Symmetrix® data storage system produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more disk drives. Thus, for example, the data device section 61 may correspond to an entire disk drive or physical storage device, may correspond to a portion of the physical disk drive or other physical device, or may correspond to a first portion of a first physical device and a second portion of a different physical device. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
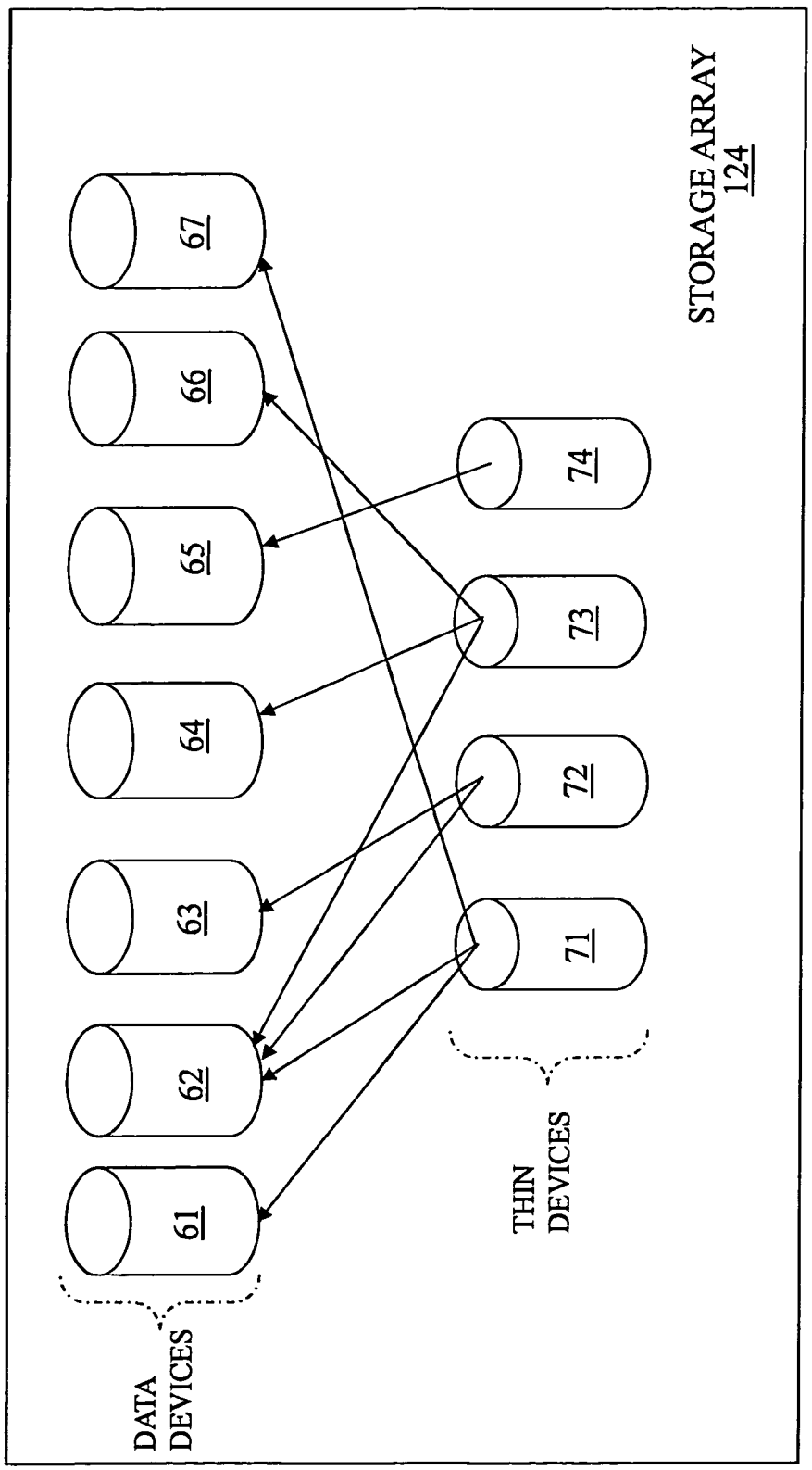

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof).

Figure 5C:
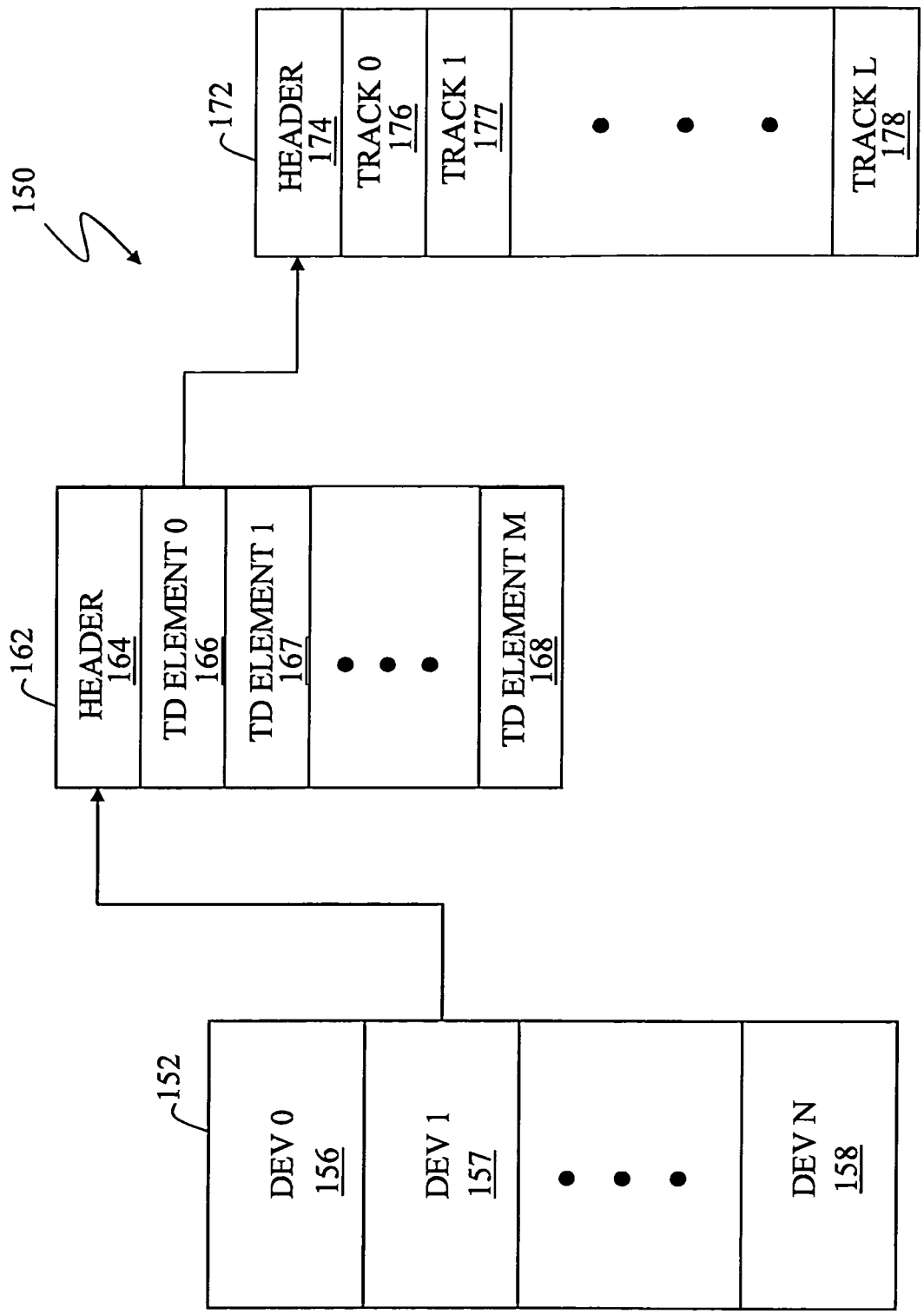
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA and/or a DA. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
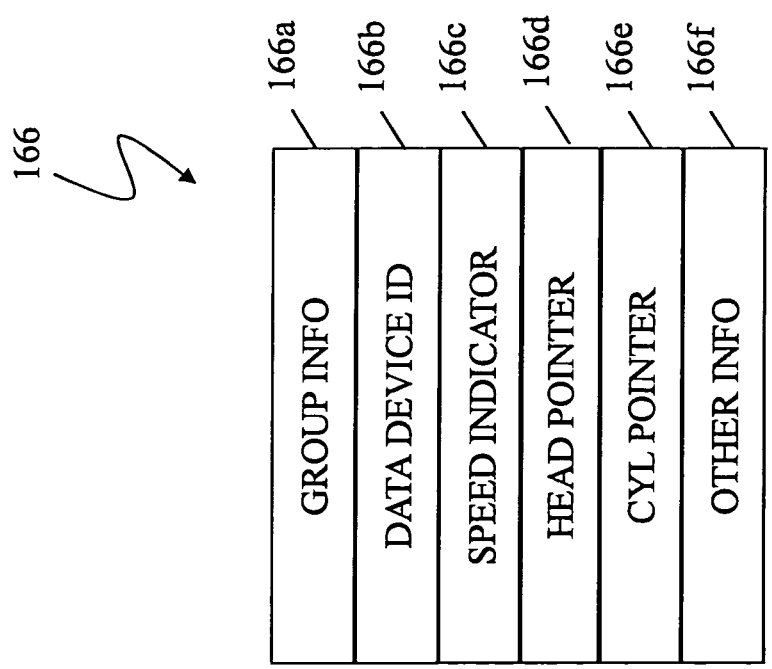
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may include a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device may not be mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. patent application Ser. No. 11/903,869, filed Sep. 25, 2007 (U.S. Pat. No. 7,822,939), DATA DE-DUPLICATION USING THIN PROVISIONING, Veprinsky et al., EMS-177US, both of which are incorporated by reference herein.

As discussed elsewhere herein, the data devices 61-67 (such as LVs or other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. For example, in one embodiment, all data associated with a single LV or logical device visible to the host may be located in the same tier. In an embodiment including thin devices, different portions of data of a single thin device may be located in different storage tiers. For example, a thin device may include two data portions and a first of these two data portions may be identified as a "hot spot" of high I/O activity (e.g., having a large number of I/O accesses such as reads and/or writes per unit of time) relative to the second of these two portions. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC or SATA disk drives.

As described above, a thin device (also referred to as a virtual provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage pool may include devices belonging to one or more different storage tiers. Each storage tier may have a same or a different associated RAID protection and associated RAID configuration. A data storage system may include any number of one or more storage pools so configured. Each storage pool may include multiple LVs and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

A thin device may contain thousands and even hundreds of thousands of such data chunks. In connection with a portion of data, such as a block, stored in a storage pool, the data portion may be partitioned into a plurality of chunks having storage provisioned across multiple RAID groups comprising the storage pool. Furthermore, storage may be provisioned for the chunks from physical devices across the pool in a distributed manner. As such, it may not be possible to readily or feasibly track the location and reconstruct the data of any specific block of data in the pool, whereby such data may be stored on different physical drives in different RAID groups of the pool. For a single storage pool including multiple RAID groups, there may be an occurrence of data unavailability or data loss (DUDL) due to a RAID group failure where the failed RAID group is not able to recover corrupted or lost data using RAID-group internal rebuild processes. Data recovery using other backup data sets for the failed RAID group is thus needed to restore the data. Furthermore, for the single storage pool including multiple RAID groups as noted above, the occurrence of DUDL for any single RAID group of the pool (e.g., when at least one RAID group of the pool experiences a DUDL occurrence) requires restoring the entire storage pool due to the inability to accurately track the location of all blocks in the pool at each point in time. Additionally, it should be noted that the more physical devices there are in a RAID group, the more likely that RAID group will fail by experiencing a DUDL. The amount of time to perform the necessary data restoration for the entire storage pool may undesirably take days, weeks, or even months.

In light of the foregoing for a storage pool, techniques are described in following paragraphs which provide use of a tool to perform risk-related assessment for one or more storage pools based on the particular storage pool configuration. The assessment may be based on criteria including availability, reliability, cost and performance. Such techniques may be used in connection with a wide variety of different applications related to pool configuration and configuration planning. For example, techniques herein may be used, to determine whether a current configuration for one or more pools meets threshold availability and/or reliability criteria, to rank and select one of multiple candidate configurations for one or more pools based on availability, reliability, costs and/or performance, and the like. The techniques utilize a probabilistic model for the assessment based on an underlying premise as noted above and described elsewhere herein that when any single RAID group of a storage pool experiences a DUDL, restoration of the entire storage pool is required. The exemplary embodiment described herein is based upon the foregoing premise as may be applied for use with virtually provisioned storage pools including thin devices. However, it will be appreciated by those skilled in the art that the techniques herein may also be used in connection with other storage pools for other types of devices and provisioning techniques to which the models described herein are applicable. Furthermore, as will also be appreciated by those skilled in the art, an embodiment in accordance with techniques herein may also modify or adapt the particular model described herein for use in connection with storage configuration evaluation and assessment of other systems. In connection with examples in following paragraphs, details such as having a single storage pool in a particular number of RAID groups, using physical devices of a particular storage tier of a particular drive technology, RAID group level and RAID configuration, and the like, are provided for purposes of illustration.

Figure 6A:
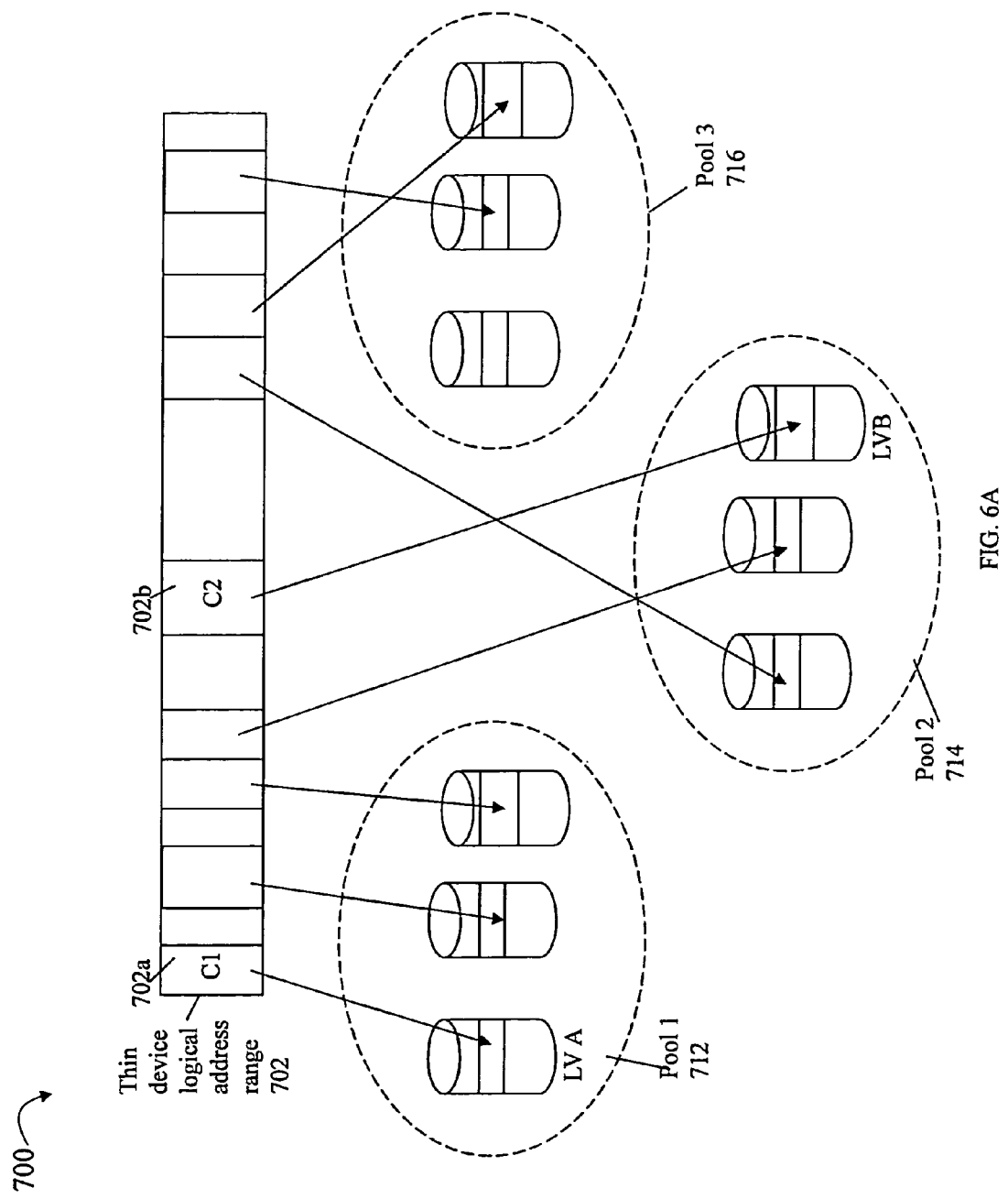
FIG. 6A is an example illustrating mapping to storage pools as may be performed for a thin device.

Referring to FIG. 6A, shown is an example 700 illustrating use of a thin device in an embodiment in accordance with techniques herein. The example 700 includes three storage pools 712, 714 and 716 with each such pool representing a storage pool of one or more RAID groups, where each such RAID group includes devices from a different storage tier. For example, pool 712 may represent a storage pool of a single RAID group of tier A (of flash storage devices having a RAID-1 configuration), pool 714 may represent a storage pool of tier B (of FC disk storage devices having a RAID-5 configuration), and pool 716 may represent a storage pool of tier C (of SATA storage devices having a RAID-5 configuration). Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device.

Figure 6B:
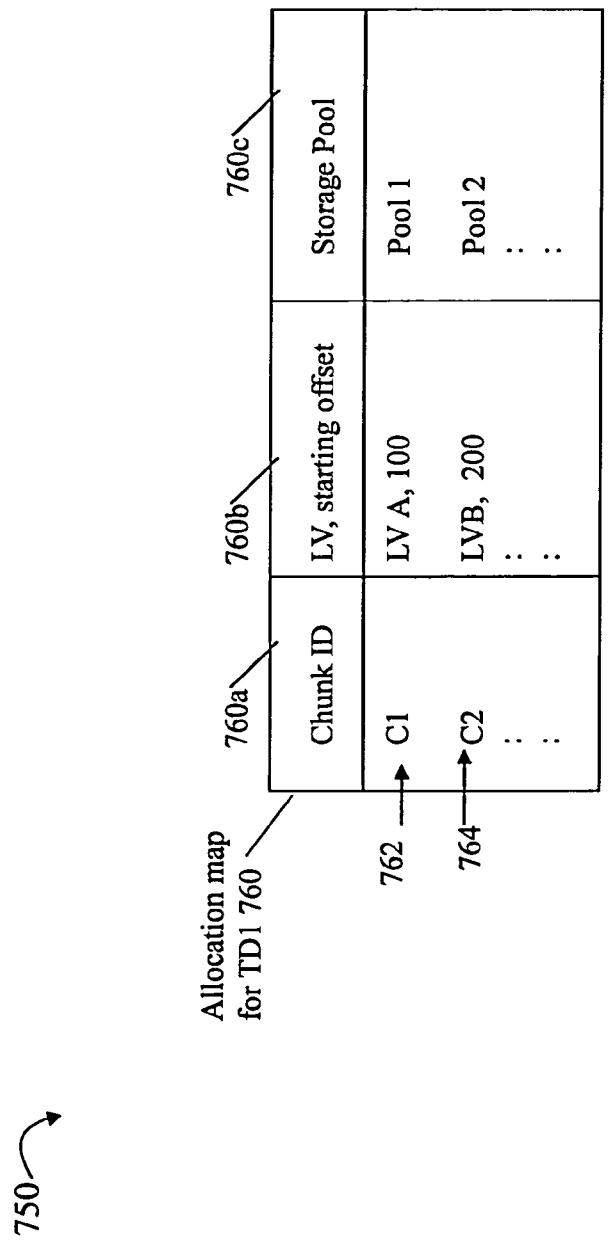
FIG. 6B is an example of representation of information that may be used in determining a physical device location mapped to a thin device.

Referring to FIG. 6B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 6A such as in connection the mapping of 702 to different storage pool devices. The allocation map 760 may contain an entry for each chunk and identify which LV and associated physical storage is mapped to the chunk. For each entry or row of the map 760 corresponding to a chunk, a first column 760*a*, Chunk ID, denotes an identifier to uniquely identify the chunk of the TD, a second column 760*b*, indicates information about the LV and offset to which the chunk is mapped, and a third column storage pool 760*c* denotes the storage pool including the LV of 760*b*. For example, entry 762 represents chunk C1 illustrated in FIG. 6A as 702*a* and entry 764 represents chunk C2 illustrated in FIG. 6A as 702*b*. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 5B.

Such information as illustrated and described in connection with FIG. 6B may be maintained for each thin device in an embodiment in accordance with techniques herein.

As also described elsewhere herein in more detail, reliability may be characterized as the probability of components, parts and systems to perform their required functions for a desired period of time without failure in specified environments with a desired confidence. Reliability does not account for any repair actions that may take place upon the occurrence of the foregoing becoming unavailable for use. Reliability accounts for the time that it will take the component, part or system to become unusable, inoperable or in a "down" state. It does not reflect how long it will take to get the unit under repair back into an operable or usable state. Thus, reliability indicates the probability of the system or pool not being in the foregoing "down" state and unreliability represents the probability of being in such a "down" state. Availability may be defined as the probability that the system is operating properly when it is requested for use. In other words, availability is the probability that a system is usable, operable or rather not in a "down" state thereby undergoing a repair or restoration action. It may seem that if a system has a high availability then it should also have a high reliability. However, this is not necessarily the case as may be illustrated using techniques described herein. As also discussed in more detail elsewhere herein, a fault, such as in connection with a physical drive of a RAID group, may or may not lead to unavailability of the system, pool or RAID group including the faulted or failed physical drive. A fault may occur and may accordingly be corrected while the system is still available. For example, in a RAID group having a RAID-6 configuration, one of the data or parity drives may physically fail causing a fault. However, the data storage system, RAID group and storage pool is still available while processing is performed to recover the data of the faulted drive, store the recovered data on a spare drive, and then resume normal processing. During the time that the foregoing elapses, the system, pool and RAID group are still available and there has not been a failure (e.g., down state or unavailability) of the RAID group whereby the RAID group cannot recover or rebuild itself internally using RAID group rebuild procedures. In the foregoing, the single drive fault can be cured so that a fault does not result in a RAID group failure. In connection with RAID-6, two drives of the RAID configuration may fail at a same time and the RAID group may still be available. Unavailability of a RAID group as described herein may mean that the RAID group is not able to supply the customer with requested data. It should be noted that the definition of availability of a system may vary with customer expectation and other factors that may affect the availability of a system besides availability of the drives containing system data. To further illustrate, the availability of a system may be affected by other factors, for example, such as a power failure, network failures, and the like. Absent these additional factors, the availability of a system may be expressed as dependent on only the drives of the system. Otherwise, the availability of a system may be dependent on the availability of the drives as well as other factors, such as availability of the network or other connection providing connectivity, availability of power, and the like as also described herein. In a similar manner, reliability may be dependent on the physical drives as well as other factors as described elsewhere herein.

Figure 7:
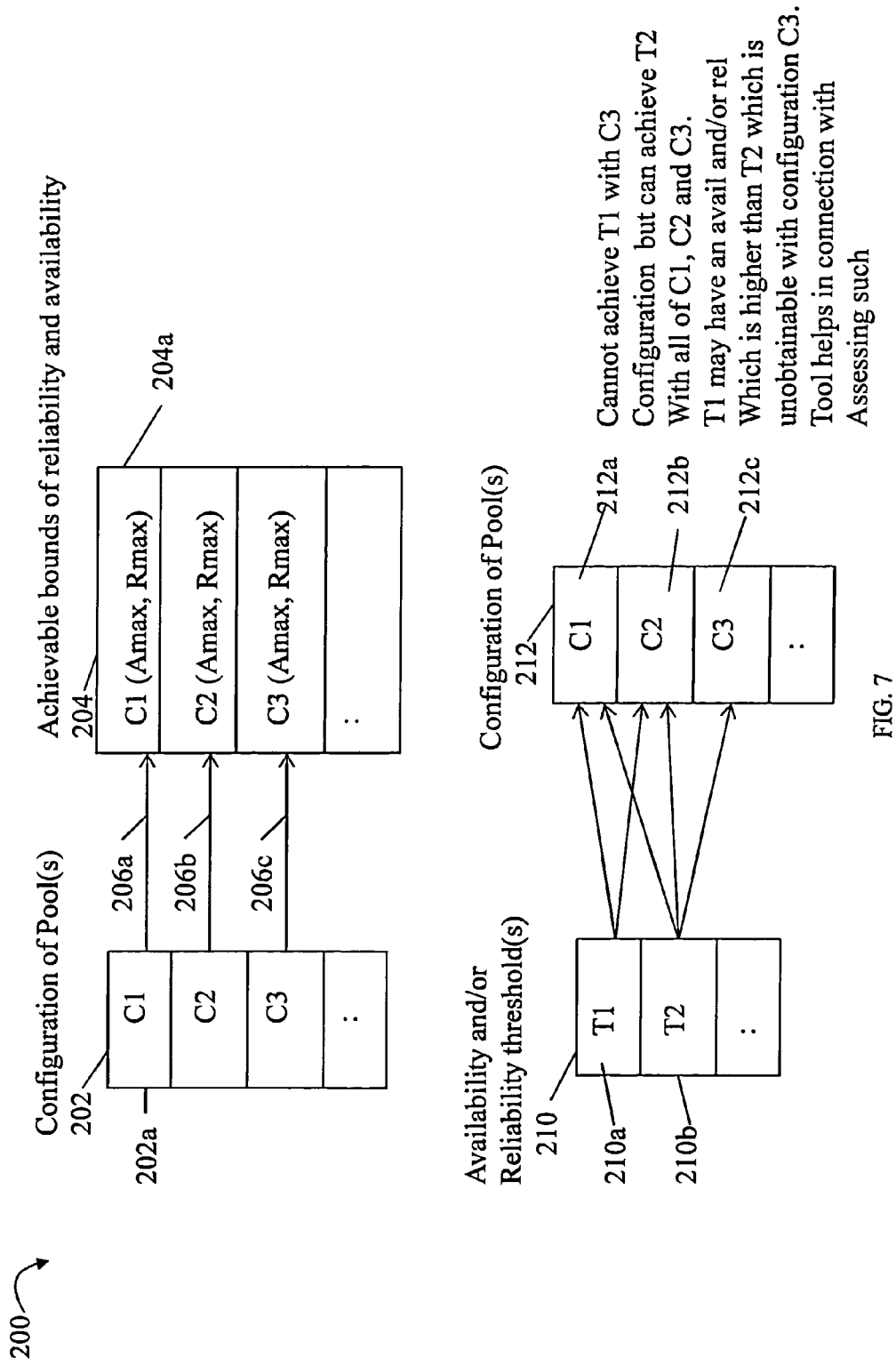
FIG. 7 is an example illustrating mappings between pool configurations and availability and reliability thresholds as may be used in an embodiment in accordance with techniques herein.

Referring to FIG. 7, shown is an example illustrating mappings between configuration pools and corresponding availability and reliability values. The example 200 includes a table 202 of configuration information for configuring one or more storage pools. There is an entry in 202 for each such set of configuration information (e.g., C1 denotes a first set of configuration information, C2 a second set of configuration information, and the like). For each entry in 202, there is a corresponding entry in table 204 indicating achievable bounds of reliability and availability. Correspondence between entries of 202 and 204 are represented using arrows 206*a*-206*c*. For example, for configuration C1 202*a*, the achievable bounds of reliability, Rmax, and availability, Amax, are indicated 204*a*. Using techniques described herein, a user may be provided with information such as represented in 204 for a particular selected configuration denoted by an entry of 202.

As a further illustration, example 200 also includes tables 210 and 212. Table 210 may represent list of entries T1, T2, and so on, where each entry includes a set of one or more availability and/or reliability threshold(s) such as may be specified by a user, determined as acceptable thresholds for customer usage, and the like. Table 212 may be as described above in connection with table 202. For the set of thresholds in each entry of 210, a set of pool configurations may be used to achieve or obtain those thresholds as denoted by the arrows between entries of 201 and 212. For example, threshold(s) T1 of entry 210*a* may be obtained using configurations 212*a* C1 and 212*b* C2 but not 212*c* C3. Threshold(s) T2 of entry 210*b* may be obtained using any of configurations C1 212*a*, C2 212*b* or C3 212*c*. For example, T1 212*a* may specify an availability and/or reliability threshold that is higher than included in T2 212*b* where such threshold(s) of T2 are not obtainable or not achievable using configuration C3 212*c*. The techniques herein may also be used in making such an assessment like the foregoing that a particular configuration such as C3 cannot be used to obtain desired threshold(s) of T1 210*a*.

Figure 8:
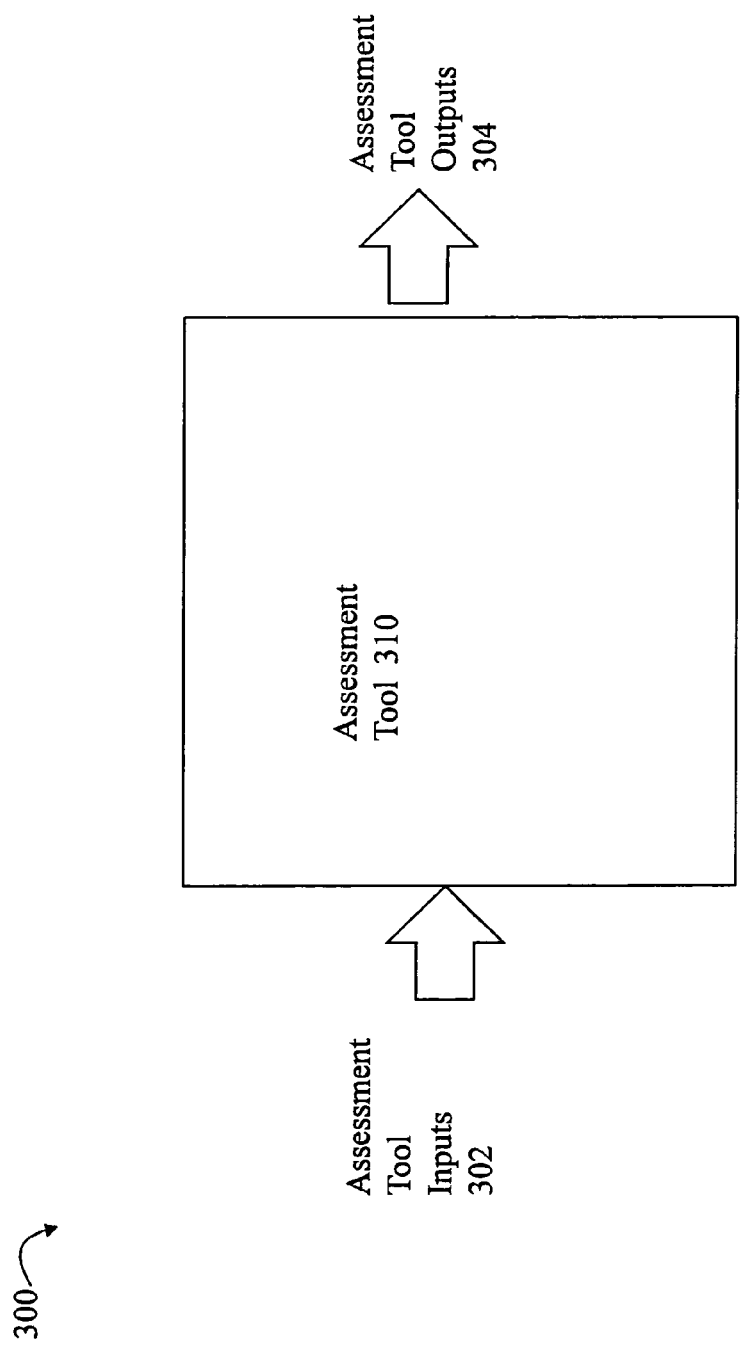
FIG. 8 is an example illustrating an assessment tool and inputs and outputs as may be used in an embodiment in accordance with techniques herein.

Referring to FIG. 8, shown is an example illustrating the techniques herein as may be embodied in a software assessment tool. The example 300 illustrates an assessment tool 310 which takes one or more assessment tool inputs 302 and generates assessment tool outputs 304. In some embodiments, the assessment tools inputs 302 may include information used to determine a trial or candidate storage pool configuration for which the assessment tool 310 performs an assessment regarding the reliability and availability. The tool 310 may output the candidate storage pool configuration along with assessment information regarding the candidate configuration, where such assessment information may include the reliability and availability information along with possibly other criteria such as cost and/or performance used in connection with the assessment of the candidate configuration. The tool 310 may output assessment information regarding one or multiple candidate configurations where such assessment and output information also includes benchmark or threshold comparisons of availability and/or reliability information calculated for each configuration to, respectively, availability and/or reliability thresholds. Rather than have the tool 310 determine the initial candidate storage pool configuration, some embodiments may have the user defined or specify such initial candidate storage pool configuration input to the assessment tool 310. Additionally, some embodiments of the tool 310 may determine alternative or additional candidate storage pool configurations for further assessment evaluation. The generation of such additional configurations and associated assessments may be performed in response to determining that the initial candidate storage pool configuration does not meet one or more specified assessment criteria including the availability and/or reliability thresholds, and possibly additional requirements or criteria such as related to costs, performance, and the like. The foregoing and other variations and uses of the techniques herein are described in more detail in following paragraphs.

It should be noted that in following paragraphs, reference for simplicity in illustration may be made to configurations for a data storage system including a single pool, particular number of storage tier(s), particular number of RAID groups in a pool, and the like. However, it will be appreciated that the techniques herein may be applied for use with multiple data storage systems, multiple pools, varying number of RAID groups and storage tiers, and the like.

The assessment tool inputs 302 may include capacity requirements, an initial storage pool configuration (or other information to enable automated determination of such an initial configuration), customer or user-specific input information, storage media type information, physical storage devices available for configuration (e.g., what the customer or user may have available, limits to the number of physical devices and associated storage media types) and possibly other information that may vary with embodiment and usage of the tool. It should be noted that consistent with the description elsewhere herein of a storage tier, one or more a storage media types may be specified. A storage media type may generally be defined as including in the aggregate the set of characteristics or attributes of a physical drive where such characteristics or attributes are those of a storage tier. In this sense, a storage tier may be defined as including physical devices of a single such physical storage media type and a RAID level and RAID configuration for configuring the physical storage media type. As described elsewhere herein, such attributes or characteristics uniquely distinguishing between different storage media types may include, for example, drive technology, physical drive storage capacity, performance aspects of the physical drives of this particular storage media type, and the like. The performance aspects of the physical drive, such as drive capabilities related to bandwidth, I/O throughput, latency, and the like, may be used in connection with techniques herein to determine rebuild times or rebuild performance rates for rebuilding data of a physical drive using internal RAID data and internal RAID group rebuilding processing upon the occurrence of a RAID group drive/member failure. As described elsewhere herein, such rebuild time relates to and affects reliability information determined for the RAID group, and also the storage pool and data storage system including the RAID group.

The capacity requirements specify the amount of storage capacity the user or customer needs for which the configuration is being performed. The capacity requirements may be specified, for example, in terms of raw physical storage capacity, such as without considering the particular RAID configuration, or in terms of user data storage capacity. The initial storage pool configuration information may be user-specified (e.g., such as by manual input by the user, in a predefined configuration file, and the like), determined in automated manner using software, and the like. If the initial pool configuration is user-specified, the user may specify the number of pool(s) and a configuration (same or different) for each pool. For each pool, configuration information may identify a storage tier (or alternatively a storage media type, RAID level (e.g., RAID-5) and RAID configuration (e.g., (3+1 or 7+1 as both are possible RAID-5 configurations), and a number of physical drives of each storage tier in the pool.

In connection with determining the foregoing initial storage pool configuration information, either by the user specifying such configuration or using an automated technique such as software, different factors may be considered. For example, the initial storage pool configuration information may be based on customer or user performance requirements, consideration of the physical storage devices available on the customer's systems, capacity requirements, cost considerations, and the like. If the initial pool configuration information is determined automatically, such information used to determine the configuration information may be input to a software program generating the configuration information as an output. The performance requirements of the customer may be related, for example, to the differing performance requirements for applications and application data stored on devices of the pool(s) for which a configuration and assessment are being performed.

The assessment tool inputs 302 may also include other customer or user-specific input information and/or possibly other information that may vary with embodiment and usage of the tool. For example, the inputs 302 may include service policy information related to a level of service and defining one or more service aspects a customer has through a service provides. Such service aspects may affect rebuild times, data restoration times and the like. For example, a customer may have service in accordance with one of a plurality of service levels such as premium (highest), enhanced (intermediate), and basic (lowest or minimum service level). Each of the foregoing may have different service times and service options. For example, premium service level may guarantee an onsite service technician or replacement of a failing physical device upon the occurrence of a DUDL within 4 hours. Enhanced service may perform the foregoing within the next business day or within 24 hours, and basic service may perform the foregoing within 3 days. The foregoing is an example of a service level aspect used as an input in connection with techniques herein that may affect achievable RTOs (recovery time objectives), rebuild times, restoration times, availability of a spare upon the occurrence of a physical drive failure (which may affect both rebuild and restoration times), and the like. Other customer-specific information may include, for example, particulars of the customer's system affecting the assessment. One such example is a number of available spare devices for use in rebuild and restoration processing upon the occurrence of a failed drive and the physical location of each such spare device. As such, aspects related to a spare device (such as physical location, availability of a spare, number of spare(s), time to acquire one if not currently onsite through a service personnel) may affect both availability and reliability as discussed elsewhere herein.

Depending on the particular usage of the tool 310, the inputs 302 may also include other information. For example, in one mode of usage, the tool may be considering whether one or more candidate storage configurations meet certain RTO criteria and the inputs may include such RTO criteria. An embodiment of the tool 310 may also allow a user to input an acceptable level or tolerance for risk (e.g., LOW, MEDIUM, HIGH) which may be mapped to predefined thresholds for availability and/or reliability. The tool 310 may perform an assessment using such thresholds such as determining whether a particular candidate configuration is able to achieve the thresholds. Furthermore, such thresholds may be customized for a particular application, subset of data used by a particular application, particular time periods, and the like. For example, a first application may be a financial application having critical important data for which a high level of both reliability and availability are needed 24 hours a day, 7 days a week. In contrast, a backup application may have its data stored on data storage and the backup application may require a high level of availability but having a high level of reliability may not be as important.

It should be noted that in an embodiment where the tool 310 performs storage pool configuration assessment in accordance with assessment criteria including availability, reliability, cost and performance, the cost and performance criteria may be used as constraints when considering or specifying candidate storage pool configurations. Cost and performance may also be used as an optimization or additional evaluation criteria such as when ranking various candidate storage pool configurations which meet availability and reliability thresholds.

The assessment tool outputs 304 may include configurations for one or more storage pools and associated assessment information such as regarding availability and reliability of each such configuration. The particular information of 304 may also vary with the particular operation performed and embodiment.

Figure 9:
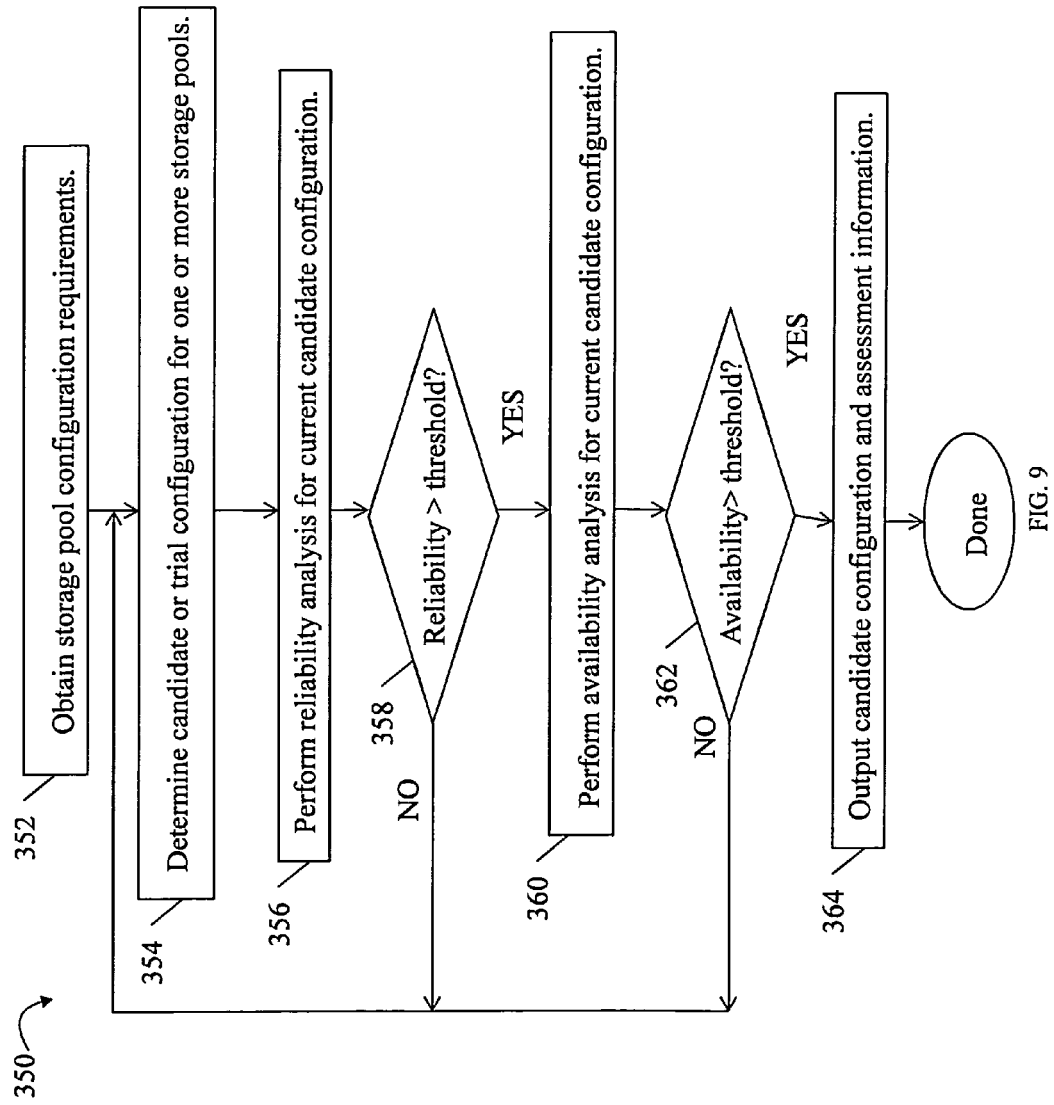
FIGS. 9 and 16 are flowcharts of processing steps that may be performed in an embodiment in accordance with techniques herein.

Referring to FIG. 9, shown is a flowchart of processing as may be performed in an embodiment in connection with techniques herein. The flowchart 350 summarized high level processing steps as may be performed in an embodiment using the assessment techniques herein such as with the assessment tool 310 of FIG. 8. The flowchart 350 summarizes processing as described generally above and elsewhere herein. At step 352, storage pool configuration requirements may be obtained. As described elsewhere herein, step 352 may include obtaining customer performance requirements, cost requirements or constraints, availability or limits regarding physical storage devices, capacity requirements, and the like. Based on the requirements of step 352, a trial or candidate configuration is determined in step 354 for one or more pools where the physical storage devices of one or more storage tiers are partitioned into the one or more pools. Step 354 may be performed manually and/or automated. From step 354, processing proceeds to step 356 to determine reliability information or a current level of reliability for the candidate configuration. The reliability information determined at step 356 may be characterized as a metric providing a net reliability indicator for the candidate configuration. As will be described elsewhere herein, if the candidate configuration includes multiple storage pools, the net reliability reflects the aggregate or collective reliability across all such storage pools. If a pool includes multiple RAID groups, the net reliability reflects the aggregate reliability for all such RAID groups in all storage pools of the candidate configuration. If a pool includes physical devices from multiple storage tiers (e.g., physical devices of multiple storage media types), the net reliability reflects the aggregate reliability for all such physical devices across all RAID groups in all storage pools of the candidate configuration. For example, the reliability information may represent a numeric value such as a probability indicating a statistically determined measurement of reliability for the current candidate configuration. At step 358, a determination is made as to whether the reliability information determined in step 356 for the current candidate configuration meets (e.g., is greater than) a reliability threshold. The reliability threshold may be determined or specified in a variety of different ways. For example, the reliability threshold may represent a numeric value such as a probability indicating an acceptable level of reliability. The reliability threshold may be, for example, predetermined based on industry practices such as by a data storage system vendor, as well as generally any other suitable ways. If step 358 evaluates to no, processing may return to step 354 to determine an alternative candidate configuration such as may be performed manually by the user modifying the previous configuration information, and/or automatically such as by generating alternative configurations which are variations of the previous candidate configuration. It step 358 evaluates to yes, processing proceeds to step 360 to determine availability information or a current level of availability for the candidate configuration. The availability information determined at step 360 may be characterized as a metric providing a net availability indicator for the candidate configuration in a manner similar to that as described herein for reliability information. At step 362, a determination is made as to whether the availability information determined in step 360 for the current candidate configuration meets (e.g., is greater than) an availability threshold. The reliability threshold may be determined or specified in a variety of different ways. For example, the availability threshold may represent a numeric value such as a probability indicating an acceptable level of availability. The availability threshold may be, for example, predetermined based on industry practices such as by a data storage system vendor, as well as generally any other suitable ways. If step 362 evaluates to no, processing may return to step 354. Otherwise, processing may proceed to step 364 where the current candidate configuration, along with its associated assessment information with respect to reliability and availability, may be output such as on a user interface (UI) display. As described elsewhere herein, an embodiment may perform additional processing steps for the current configuration and additional configurations as may vary with embodiment. The flowchart 350 merely illustrates overall processing that may be performed in one embodiment performing an assessment to determine a single configuration in accordance with assessment criteria including reliability and availability (and optionally cost and performance requirements as may be used in determining the candidate or trial configurations).

The general process noted above will now be described in more detail with reference to particular example in connection with FIG. 10. The example 400 represents the different dependencies between various inputs, outputs and processing as may be performed in one embodiment in accordance with techniques herein. The example 400 provides additional detail regarding the general processing described above such as in connection with FIG. 9.

As described above, storage device pools may be comprised of a plurality of storage tiers and thus a plurality of types of storage media. Consistent with description elsewhere herein, a storage medium type may be defined as being distinguished from other storage medium types by read and write speeds, capacity of a unit, technology kind and construction such as magnetic media versus static electronic storage and different types of electronic media (dynamic, static), and mechanical systems and optoelectronics. Other differentiations may include quality as may be reflected in the mean time to failure, cost, internal data storage organization, the presence or absence of device-internal block and track protection such as wear leveling in SSDs, and other factors that may influence the protection, reliability and speed of reading and writing of data to and from the physical devices of the data storage system 410. A data storage medium type may also be have other information input into the assessment techniques described herein related to physical location such as related to a topological position in the system where such position may be of benefit or may be detrimental to the rate of reading from and/or writing to the storage medium, even though the storage medium may be identical in every other respect to other devices in the system. For example, as illustrated in the example 400, a spare may be within the same physical enclosure, such as a Disk Array Enclosure or DAE (as manufactured by EMC Corporation) as a failed device 401a, or may exist in a different enclosure requiring transmission over a backend fabric or network 401. Such characteristics or attributes of storage media types as related to spares as well as other described herein may be considered when determining the reliability and/or availability of a pool comprised of storage media in a specific storage system of which 401 is an example. To further illustrate, for example, the location of spare media 401a, 401b may be part of the requisite configuration data as such spare devices may be in various locations relative to other physical devices as may be used in rebuilding or restoring data of a failed device which is written to a spare device. Such data being restored, for example, may be written to a spare device of 401 over a network or other fabric rather than from another data storage system or host computer directly connected to the data storage system 401. It is well known that longer rebuild times for a physical device of a RAID group increase the exposure time risk of an occurrence of a DUDL state for the RAID group.

Given a data storage system 401 including multiple storage media types, the techniques herein may be used to configure storage devices into one or a plurality of pools for one or more applications such as a database program 402 using all or a fraction of the different physical storage media within a single storage system 401. In the example 400, a data storage system 401 such as manufactured by EMC Corporation may contain three hundred and sixty (360) medium speed (e.g., 15K RPM) FC technology drives each having a 600 GB capacity, sixty-four (64) high speed SSDs of 400 GB with one spare within the same DAE (such as represented by 401a), and seven-hundred and twenty (720) relatively low speed 3TB (three terrabyte) SATA mechanical storage devices with 16 spare drives, and sixty-four (64) EFD FLASH drives of 512 GB.

As a first step in connection with determining an initial candidate or trial configuration 409, one or more requirements may be considered such as, for example, performance and capacity requirements 405 and application-specific requirements such as workload and performance requirements for the database application 402. An exemplary performance requirement may be for a response time of t milliseconds with an IO load of 10,000 IOPS (regular workload) and a logical capacity of 0.2 Petabytes (200 Terabytes or 200,000 Gigabytes), meaning the useable capacity must be 0.2 Petabytes and RAID parity overhead is additional. Additionally, reliability thresholds which must be met in connection with reliability in 412 and availability in 413 may be, for example, a reliability threshold of less than 0.05% over 5 years and an availability of "five nines" or 0.99999 percent.

The choice of device type and protection may be driven by both the response and the capacity requirements. In assessing the particular data sets accessed by the application 402, it may be determined, for example, that 80% of the data is not accessed frequently and may be stored on slower, low cost devices, 15% on medium speed devices, and 5% on high speed devices. Consequently, in accordance with the foregoing, a configuration may be determined including 0.16 Petabytes (PB) of data space on the slow devices, 0.03 PB (300,000 GB) on medium speed devices such as fiber channel technology devices and 100,000 GB on high speed FLASH devices. Such a configuration may be reflected in storage tiers with a RAID level and RAID configuration assigned to each tier. These tiers require for the raw data capacity (excluding parity) 80 SATA drives with 1TB hypers, 50 FC Drives of 600 GB hypers, and 25 FLASH Drives of 400 GB hypers, where a hyper may be part or all of the allocatable space on a storage device. The extra protective parity data for RAID adds to the storage requirements. For example, for RAID1, which is the RAID with the highest data response speed, the data space must double as the protection is a direct mirror copy. On the other hand, RAID5, 7+1 (e.g., 7 data drives and 1 parity drive) requires only 12.5% of additional space for the RAID protection overhead data. One skilled in the art may add additional devices to accommodate the parity data and may determine that to meet threshold reliability requirements, the RAID may need to be, for example, RAID6 6+2 for the SATA devices. Unfortunately, this may reduce the overall system performance since RAID6 is generally known to be slower in response than RAID 1 and RAID5 configuration, and may reduce performance to a point where the only option is to spread the data over more SATA drives and reduce the data per drive. The increase in drives creates parallel processing capability over more CPU cores in the storage system, and thereby increases speed of response.

When considering different configuration options, it should be noted that increasing a number of physical drives such as in a storage pool or RAID group may increase performance of that pool or RAID group, but this generally comes at increased cost (due to requiring more drives) and decreased reliability for the pool or RAID group though generally the reliability may be maintained at a threshold level by the selected higher-protecting RAID. It should also be noted that increasing the number of physical drives is one way in which performance may be increased however, it also has a downside of, upon the occurrence of a DUDL for a RAID group in a storage pool, the time required to restore the RAID group is the time to restore the entire storage pool, and hence the time is now significantly increased.

The customer or user may examine performance related data characterizing the workload of the system and application for which storage is now being configured. Such performance-related data may be collected as described, for example, in connection with FIG. 3 as described above. The performance-related data characterizing current workload of the system and application may be performed with respect to time and storage activity representative of a typical business period during normal operations. From examining this performance-related data, the user may determine, for example, that 5% of the data may be placed on the high speed storage media (e.g., EFD) to achieve the needed low latency performance, provided all sixty-four EFD drives are used. In order to obtain low latency for the remaining 95% of user data, the user determines that a split of approximately 15% on the Fiber channel with RAID1 and the remaining 80% on the SATA drives with RAID5 3+1 of the least frequently used data yields a weighted average latency that meets the requirement.

In connection with the foregoing, the user may determine a workload estimate for the different storage tiers and devices based on previously collected or observed performance data. However, any suitable technique such as modeling may be used in connection with obtaining the performance data and determining workload estimates 404 for the candidate configuration. Such workload estimates may be determined for each storage tier of the storage pool. For example, with reference to element 409, such workload estimates may be determined for each row 409a-409c corresponding to a different storage tier.

Based on the foregoing, an initial configuration for a single storage pool may be specified as in 409. In 409, the first column denoted TYPE includes storage media types, the second column QTY denotes a number of physical drives, the third column RAID denotes a particular RAID protection level and RAID configuration and the fourth column LUN (GB) denotes a user data storage capacity in GBs. Each row 409a-409c of 409 denotes configuration information for a single storage tier of the pool. Row 409a specifies that the storage pool includes physical devices of FC storage media type (TYPE 1) and associated storage tier configured into multiple RAID groups having a RAID 5, 7+1, configuration. Row 409b specifies that the storage pool includes physical devices of the SATA storage media type (TYPE 2) and associated storage tier configured into multiple RAID groups having a RAID 1 configuration. Row 409c specifies that the storage pool includes physical devices of the EFD storage media type (TYPE 3) and associated storage tier configured into multiple RAID groups having a RAID 5, 3+1, configuration.

In connection with performing the assessment in an embodiment in accordance with techniques herein, a model may be used to estimate the associated reliability and availability. Before proceeding further with further description in connection with FIG. 10, reference will first be made to FIG. 11 and a description of a model that may be used in connection with techniques herein.

In one embodiment in accordance with techniques herein, an embodiment may use Markov-based processes to model the system and state change with respect to a particular data storage configuration under analysis. As known in the art, a Markov chain of processes may be used to represent a mathematical system that undergoes transitions from one state to another. It may be further characterized as a random process whereby the next state depends only on the current state and not on the entire history or previous states. Markov chains have many applications in statistical modeling of real-world processes such as may be used in an embodiment in accordance with techniques herein as described herein. The Markov processes characterize a "discrete-time" random process involving a system which is in a certain state at each "step", with the state changing randomly between steps. The Markov property states that the conditional probability distribution for the system at the next step (and in fact at all future steps) given its current state depends only on the current state of the system, and not additionally on the state of the system at previous steps. Since the system changes randomly, it is generally impossible to predict the exact state of the system in the future. However, using statistical properties of the system, subsequent future states may be predicted. The changes of state of the system are called transitions, and the probabilities associated with various state-changes are called transition probabilities. The set of all states and state transition probabilities characterizes a Markov chain.

In terms of probabilities and statistics, a Markov chain may be further described as sequence of random variables $X_1, X_2, X_3, \ldots$ with the Markov property, namely that, given the present state, the future and past states are independent. Formally, this may be represented as:

$$Pr(X_{n+1}=x|X_1=x_1, X_2=x_2, \ldots, X_n=x_n) = Pr(X_{n+1}=x|X_n=x_n).$$

The possible values of $X_i$ form a countable state space S of the chain. As will now be described with reference to FIG. 11, Markov chains such as may be used in connection with techniques herein may be represented using directed graphs where the nodes correspond to the states and edges between nodes or states are labeled by the probabilities of going from one state to the other states.

In connection with techniques herein, a storage pool may include a plurality of RAID groups, each of the RAID groups comprising storage devices of a single storage media type. As described elsewhere herein, the storage pool is considered to be in a DUDL state requiring data restoration of the entire pool when any one or more RAID groups of that storage pool enter a "down" or "unavailable" state whereby the RAID group is not able to internally rebuild the failed drive or corrupted data using its own RAID internal rebuild processes. For example, such RAID internal rebuild processing may include a RAID group using data and parity information to rebuild a failed RAID group drive member. With a RAID5 RAID group, the RAID group can tolerate a single drive member failure and rebuild the failed drive's data. Upon the occurrence of a having two drive members of the RAID5 group fail during a same time period, the RAID5 group is not able to rebuild both failed drives using its internal RAID rebuild procedures and may be characterized as entering the DUDL (e.g., down or unavailable) requiring restoration of the entire RAID group's data from a data set/source external to the RAID group. With a RAID6 RAID group, the RAID group can tolerate a up to two drive members failing and is able to rebuild the both failed drives' data using internal RAID group procedures. Upon the occurrence of a having a three drive members of the RAID6 group fail during a same time period, the RAID6 group is not able to rebuild the three failed drives using its internal RAID rebuild procedures and may be characterized as entering the DUDL (e.g., down or unavailable) requiring restoration of the entire RAID group's data from a data set/source external to the RAID group. As such, Markov processes may be used to model states for each of the different RAID group levels and configurations to determine a probability associated with being in the DUDL state for a represented RAID group and/or also to determine a probability with being in a state other than the DUDL state. The foregoing probabilities may be used in connection with determining indicators in terms of probabilities for reliability and availability for each RAID group. Further general and well known mathematics may then be applied to determine the probabilities for reliability and availability for a storage pool including multiple RAID groups whereby the storage pool enters the DUDL state when any one or more of its RAID groups enters the DUDL state. Furthermore, such probabilities for multiple storage pools may be combined to determine a net or combined value for reliability and a net or combined value for availability using general and well known mathematics.

Figure 11:
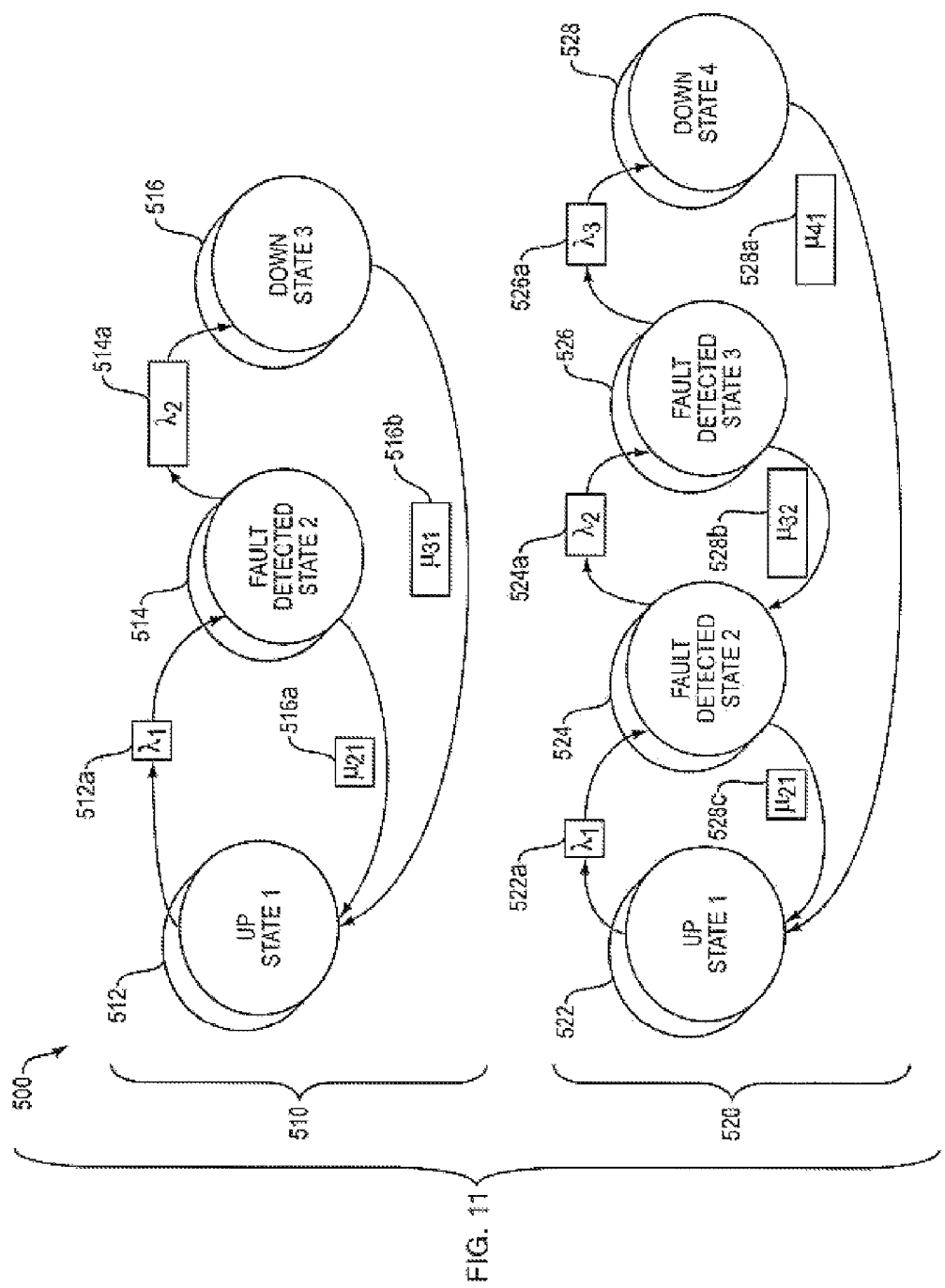
FIG. 11 is an illustration of a state transition diagram of Markovian processes as may be used in an embodiment in accordance with techniques herein.

Referring to FIG. 11, shown is an example 500 including a first representation 510 illustrating use of Markov diagrams and processes to represent states for a RAID5 group and a second representation 520 illustrating use of Markov diagrams and processes to represent states for a RAID6 group. The representation 510 includes states 512, 514 and 516 and state transitions 512a, 514a, 516a and 516b. State 512 may represent the UP state whereby no drive members in the RAID5 group have failed. If, while in state 512, a first RAID group drive fails, the state transition 512a to state 514. State 514 may represent a RAID group Fault state whereby a single drive member in the RAID5 group has failed and the system is able to internally rebuild the failed drive's data in order to return the RAID group to state 512 as represented by transition 516a. If, while in state 514 prior to completing rebuild of the first failed RAID5 group member a second drive of the RAID group also fails, the RAID group transitions 514a to the DOWN or DUDL state 516 whereby an entire restoration of the RAID group is needed from another data set external to the RAID group. As represented by state 516, the RAID group is not able to rebuild the failed drives using RAID group internal data and procedures so that when in state 516, the RAID5 group is not able to provide data to a requester. In contrast, the RAID5 group is able to serve data requests when in state 514 while rebuilding. Transition 516b may represent the transition in connection with RAID group data restoration to transition the RAID group from the DUDL state 516 to the UP state 512 having no failed drive members.

The representation 520 includes states 522, 524, 526 and 528 and state transitions 522a, 524a, 526a, and 528a-528. State 522 is analogous to state 512 above but as applied to a RAID 6 group. State 522 may represent the UP state whereby no drive members in the RAID6 group have failed. If, while in state 522, a first RAID group drive fails, the state transition 522a to state 524. State 524 may represent a RAID group Fault state whereby a single drive member in the RAID6 group has failed and the system is able to internally rebuild the failed drive's data in order to return the RAID group to state 522 as represented by transition 528c. If, while in state 524 prior to completing rebuild of the first failed RAID6 group member a second drive of the RAID group also fails, the RAID group transitions 524a to the fault state 526. State 526 may represent a RAID group Fault state whereby a second drive member in the RAID6 group has failed and the system is able to internally rebuild the failed drive's data in order to return the RAID group to state 524 as represented by transition 528b. If, while in state 526 prior to completing rebuild of one of the two failed RAID6 group members yet a third drive of the RAID group also fails, the RAID group transitions 526a to the DOWN or DUDL state 528 whereby an entire restoration of the RAID group is needed from another data set external to the RAID group. As represented by state 528 (similar to 516), the RAID group is not able to rebuild the three failed drives using RAID group internal data and procedures so that when in state 528, the RAID6 group is not able to provide data to a requester. In contrast, the RAID6 group is able to serve data requests when in either of states 524 or 526 while rebuilding. Transition 528a may represent the transition in connection with RAID group data restoration to transition the RAID6 group from the DUDL state 528 to the UP state 522 having no failed drive members.

In connection with 510 and 520, a rate is associated with each transition as indicated by various µ's and λ's denoted for the transitions in FIG. 11. The µ's may represent repair rates to return a current state to a previous state, and the λ's may represent failure rates where a RAID group drive member fails. In order to calculate the reliability and availability of a RAID group when constant failure rates $\lambda_i$ and constant repair rates $\mu_{ji}$ are in effect, Markov diagrams 510 for RAID5, and 520 for RAID6 may be solved for probabilities of failure in time and net availability. Such calculations may be time dependent or alternatively solved as steady state solutions (e.g., limit is time tends to infinity). In most instances the steady state calculations are sufficient, which are achieved by solving the time-dependent equations by letting t→∞, but the time dependent calculations are preferred as they cover all cases. Systems typically have a finite life of five years, and the finite life may be considered an upper limit on the lifetime of any RAID group or pool. Other systems and pools may have lifetimes less than the lifetime limit, and may be frequently modified. Consequently, an embodiment may prefer to use the time based equations.

As described in more detail below, reliability reflects the frequency of failure and I may be calculated from the absorbing Markov case by first removing the transition arrow $\mu_{31}$ 516b in 510 and transition arrow $\mu_{41}$ 528a in 520 and then recalculating the Markov equations. The results may be used to estimate the RAID group reliability with time, and hence also the reliability of the pool including the RAID group.

In time-dependent Markov processes the probability of occupancy of a particular state i at time t, is an evolution from an initial condition at time t=0 to a state at time t=t and can be expressed in the form:

$$\Pi(t) = \Gamma E(t) \qquad \text{Equation 1}$$

where Π(t) represents the set of occupancy probabilities of Markov states Π(t)={$\pi_i(t)$; i=1 ... M}. The coefficients Γ={$\Gamma_{ij}$; i=1 ... M; j=1 ... M} represent the net relative strength of contributions from paths in the Markov to the state i and will be different for each state since path topology to neighboring states are unique. Each path contributes to the time constants a={$a_j$; j=1 ... M}, and consequently the net evolution of state occupancy probability is additionally governed by the characteristic time constants inherent in the Markov {$a_j$; j=1 ... M}. Since the system is closed the constraint $$\sum_{i=1}^{M} \pi_i(t) = 1 \qquad \text{Equation 2}$$

additionally applies. It should be noted that E(t) is a row vector with exponential time dependent terms including the time constants $a_j$ For RAID protected group of storage devices, a reliability diagram used to determine reliability for a RAID group has an absorbing Markov state as the last state in a Markov chain. An absorbing state may be characterized as a state for which this is no transition out of Thus, when using 510 and 520 for determining reliability values, the transitions 516b and 528 and associated rates are not utilized. An Availability diagram is cyclic and returns the last state (e.g., 516 and 528) to one of the prior states. As such, 510 and 520 may be used as illustrated in FIG. 11 when determining availability for the RAID group. Such additions and/or removal of paths therefore changes the characteristic strengths $\Gamma_{ij}$ (e.g., referencing an element in the matrix $\Gamma$ using subscript i to reference a row and j to reference a column) and time constants $a_j$ depending on whether reliability or availability is being determined. Steady state conditions apply in the limit t→∞. Because of this condition, we note that all $a_j \leq 0$.

In the Markov diagrams, the rate of transition from state i to the subsequent state is designated by the rate $\lambda_i$. The return transition which represents the rate of automatic rebuild and/or restoration may return the system to the prior state, or back to the full initial up-state (state i=1). The return rates are therefore designated by $\mu_{ji}$:j>i in moving from the jth state to the ith state. It should be noted that transitions 516b and 528a may represent a restoration rate as opposed to a rebuild rate associated with each of the remaining transitions. The restoration rates for 516b, 528a refer to the rate at which data is restored from an external data set. The rebuild rates denoted by 512a, 514a, 516a, 516b, 522a, 524a, 526a, and 528a-528c relate to rates for performing the internal RAID group rebuild processing such as may be performed while also servicing I/O requests using the RAID group data. Thus, the RAID group data may be available for use when in any of states 512, 514, 522, 524 and 526.

As used in connection with techniques herein, Time t may be normally measured in operational hours of the pool, and is so may be assumed throughout description herein for active or non-spare devices. For spare devices, some acceleration factor may be included to designate that the expected usage or lifetime for these devices is different, for example in terms of 'shelf-life' where solid state devices can degenerate over time from electromigration and other phenomena unrelated to operational activities.

The absorbing Markov diagrams where at least one state has only one or more input arrows and no outgoing transitions, results in a Reliability R(t) calculation. R(t) may be determined with respect to an entity such as a RAID group, storage pool, multiple storage pools and entire system and may be the probability of finding the foregoing in the up state at time t. Alternately, this may also be described as determining the entity, such as the RAID group and thus the pool including the RAID group is not in the DUDL state at time t. As noted above, the illustrations 510 and 520 for a RAID group may be modified when used in connection with reliability modeling by removing 516a and 528a.

Unreliability U(t) is the net probability of finding the system, storage pool, RAID group, or other entity, in an absorbing state of the Markov diagram. It is represented by the occupancy probability at the absorbing node. No steady-state condition may exist for reliability since at t=infinity the system is in the down state.
We note the constraint $$U(t)+R(t)=1 \qquad \text{Equation 3}$$

holds for all t. From the diagrams $$U(t)=\pi_q(t) \qquad \text{Equation 3A}$$

where q=3 for RAID5 and RAID1, and q=4 for RAID6 in the absorbing Markov diagrams.

Availability A is the probability of determining that a reparable pool is found to be in a state other than 516 and 528. Unavailability $\overline{A}$ is the probability of determining the pool is in the down state or DUDL state as represented by 516 and 528. A time dependent calculation determines the Availability and Unavailability at time t. It is noted that $$\overline{A}(t)=\pi_q(t) \qquad \text{Equation 3B}$$

where q=3 for RAID5 and RAID1, and q=4 for RAID6 in the cyclic versions of the Markov diagrams.

Steady state solutions assume the probabilities are averaged over the interval [0,∞]. One steady state solution commonly is usage for a typical device, pool or system's availability can be written $$A(0, \infty) = \frac{MTTF}{MTTF + MTTR} \qquad \text{Equation 4}$$

$$\overline{A}(0, \infty) = \frac{MTTR}{MTTF + MTTR} \qquad \text{Equation 5}$$

where MTTF=mean time to failure, and MTTR=mean time to repair. In this instance the availability is synonymous with the fraction of time the system is up compared to the total time between failures (often referred to as the mean time between failures or MTBF=MTTF+MTTR). These values may reflect the net effects from multiple devices or groups of devices as in RAID groups which in a reliability block diagram shown below are placed in series.

Any one block that fails in this series arrangement implies a system down event, and the MTTF and MTTR. We note $$\forall_t : A(t)+\overline{A}(t)=1 \qquad \text{Equation 6}$$

All the above predicates a constant failure rate i.e. that the number of devices lost to failure −dN between t and t+dt is proportional to the number of remaining devices and the time interval $$-dN=N\lambda dt \qquad \text{Equation 6A}$$

from which we obtain the probability of any one device being up (the reliability R(t) of the device) as $$\frac{N(t)}{N_o(t=0)} = R(t) = e^{-\lambda t} \qquad \text{Equation 7}$$

If Equation 7 does not hold, Markovian calculations may be modified or simulations constructed to make use of other statistical models such as Weibull distributions, as is well known in the art, to obtain N(t), or MTTF and MTTR, and consequently the reliability and availability values.

As will be appreciated by those skilled in the art in connection with Equation 7, "e" denotes the exponential function as related to the natural logarithm. With the exponential function $e^x$, e is the number (approximately 2.718281828) such that the function $e^x$ is its own derivative. The exponential function is used to model a relationship in which a constant change in the independent variable gives the same proportional change (i.e. percentage increase or decrease) in the dependent variable. The function is often written as exp(x), especially when it is impractical to write the independent variable as a superscript.

In connection with the above, the availability and reliability of a RAID group may be determined as the probability that the RAID group is not in an absorbing state representing DUDL (e.g., not in state 516 for a RAID5 group and not in state 528 for a RAID 6 group). It should be noted that a RAID-1 group is represented in manner similar to that as a RAID 5 group by 510 having a similar tolerance level for a single drive fault prior to entering the DUDL state 516.

With reference to Equation 1 and 510 of FIG. 11, availability for a RAID 1 and RAID 5 group may be expressed as $A(t)=1-\pi_3(t)$, which, in terms of Equation 1 may be represented as $\Gamma E(t)$ where:

$$E(t) = \begin{pmatrix} 1 \\ e^{a_1 t} \\ e^{a_2 t} \end{pmatrix}$$

and $$\Gamma = \begin{pmatrix} \frac{\mu_{31}(\lambda_2 + \mu_{21})}{\lambda_1 \lambda_2 + \mu_{31}(\lambda_1 + \lambda_2 + \mu_{21})} & a_2(\mu_{31} + a_1)(\lambda_2 + \mu_{21} + a_1) & a_1(\mu_{31} + a_2)(\lambda_2 + \mu_{21} + a_2) \\ \frac{\lambda_1 \mu_{31}}{\Lambda} & \frac{\lambda_1 a_2(\mu_{31} + a_1)}{[\Lambda(a_1 - a_2)]} & \frac{\lambda_1 a_1(\mu_{31} + a_2)}{[\Lambda(a_1 - a_2)]} \\ \frac{\lambda_1 \lambda_2}{\Lambda} & \frac{\lambda_1 \lambda_2 a_2}{[\Lambda(a_1 - a_2)]} & \frac{\lambda_1 \lambda_2 a_1}{[\Lambda(a_1 - a_2)]} \end{pmatrix}$$

wherein $$K = (\lambda_1 + \lambda_2 + \mu_{21} + \mu_{31})$$

$$\Lambda = \lambda_1\lambda_2 + \mu_{31}(\lambda_1 + \lambda_2 + \mu_{21})$$

$$a_1 = \frac{-K + \sqrt{K^2 - 4\Lambda}}{2}$$

$$a_2 = \frac{-K - \sqrt{K^2 - 4\Lambda}}{2}$$

With reference to Equation 1 and 510 of FIG. 11 with 516b removed, reliability for a RAID 5 and RAID 1 group may be expressed as $R(t)=1-\pi_3(t)$, which, in terms of Equation 1 may be represented as $\Gamma E(t)$ where:

$$\Gamma = \begin{pmatrix} 0 & \frac{(\lambda_2 + \mu_{21} + a_1)}{(a_1 - a_2)} & -\frac{(\lambda_2 + \mu_{21} + a_2)}{(a_1 - a_2)} \\ 0 & \frac{\lambda_1}{(a_1 - a_2)} & -\frac{\lambda_1}{(a_1 - a_2)} \\ 1 & \frac{a_2}{(a_1 - a_2)} & -\frac{a_1}{(a_1 - a_2)} \end{pmatrix}$$

and $$E = \begin{pmatrix} 1 \\ e^{a_1 t} \\ e^{a_2 t} \end{pmatrix} \text{ and}$$

wherein $$a_1 = \frac{-(\mu_{21} + \lambda_1 + \lambda_2) + \sqrt{(\mu_{21} + \lambda_1 + \lambda_2)^2 - 4\lambda_1\lambda_2}}{2}$$

$$a_2 = \frac{-(\mu_{21} + \lambda_1 + \lambda_2) - \sqrt{(\mu_{21} + \lambda_1 + \lambda_2)^2 - 4\lambda_1\lambda_2}}{2}$$

With reference to Equation 1 and 520 of FIG. 11, availability for a RAID 6 group may be expressed as $A(t)=1-\pi_4(t)$, which, in terms of Equation 1 may be represented as $\Gamma E(t)$ where:

$$E(t) = \begin{pmatrix} 1 \\ e^{a_1 t} \\ e^{a_2 t} \\ e^{a_3 t} \end{pmatrix} \text{ and}$$

$$\Gamma = \begin{pmatrix} \frac{\mu_{41}(\lambda_2\lambda_3 + \lambda_3\mu_{21} + \mu_{21}\mu_{32})}{\Omega_p} & \frac{\lambda_1}{\Omega_p D(a_1)}\sum_{r=1}^{3} F_{1r}a_1^{r-1} & \frac{\lambda_1}{\Omega_p D(a_2)}\sum_{r=1}^{3} F_{1r}a_2^{r-1} & \frac{\lambda_1}{\Omega_p D(a_3)}\sum_{r=1}^{3} F_{1r}a_3^{r-1} \\ \frac{\{\lambda_1\mu_{41}(\lambda_3 + \mu_{32})\}}{\Omega_p} & -\frac{\lambda_1}{\Omega_p D(a_1)}\sum_{r=1}^{3} F_{2r}a_1^{r-1} & -\frac{\lambda_1}{\Omega_p D(a_2)}\sum_{r=1}^{3} F_{2r}a_2^{r-1} & -\frac{\lambda_1}{\Omega_p D(a_3)}\sum_{r=1}^{3} F_{2r}a_3^{r-1} \\ \frac{\mu_{41}\lambda_1\lambda_2}{\Omega_p} & -\frac{\lambda_1\lambda_2}{\Omega_p D(a_1)}\sum_{r=1}^{3} F_{3r}a_1^{r-1} & -\frac{\lambda_1\lambda_2}{\Omega_p D(a_2)}\sum_{r=1}^{3} F_{3r}a_2^{r-1} & -\frac{\lambda_1\lambda_2}{\Omega_p D(a_3)}\sum_{r=1}^{3} F_{3r}a_3^{r-1} \\ \frac{\lambda_1\lambda_2\lambda_3}{\Omega_p} & -\frac{\lambda_1\lambda_2\lambda_3}{\Omega_p D(a_1)}\sum_{r=1}^{3} F_{4r}a_1^{r-1} & -\frac{\lambda_1\lambda_2\lambda_3}{\Omega_p D(a_3)}\sum_{r=1}^{3} F_{4r}a_2^{r-1} & -\frac{\lambda_1\lambda_2\lambda_3}{\Omega_p D(a_3)}\sum_{r=1}^{3} F_{4r}a_3^{r-1} \end{pmatrix}$$

where the coefficients $F_{ij}$ are given by the 3×4 matrix:

$$F = \begin{pmatrix} \begin{bmatrix} \lambda_2\lambda_3[\lambda_2\lambda_3 + \mu_{41}(\lambda_3 + \lambda_2 + \mu_{32} + \mu_{21})] \\ +\mu_{41}^2\begin{pmatrix} \lambda_2^2 + \lambda_3^2 + \mu_{32}^2 + \lambda_2\lambda_3 \\ +2\lambda_2\mu_{32} + 2\lambda_3\mu_{32} \\ +\lambda_2\mu_{21} \end{pmatrix} \end{bmatrix} & \begin{bmatrix} \mu_{41}^2(\mu_{32} + \lambda_2 + \lambda_3) \\ +\mu_{41}\begin{pmatrix} \lambda_2^2 + \lambda_3^2 + \mu_{32}^2 + \mu_{21}\lambda_2 \\ +2\begin{pmatrix} \lambda_2\lambda_3 + \lambda_2\mu_{32} \\ +\lambda_3\mu_{32} \end{pmatrix} \end{pmatrix} \\ +\lambda_2^2\lambda_3 + \lambda_2\lambda_3^2 + \lambda_2\lambda_3\mu_{32} \\ +\mu_{21}\lambda_2\lambda_3 \end{bmatrix} & \begin{bmatrix} \lambda_2\lambda_3 + \\ \mu_{41}\begin{pmatrix} \lambda_2 + \lambda_3 \\ +\mu_{32} \end{pmatrix} \end{bmatrix} \\ \begin{bmatrix} \mu_{41}^1\begin{pmatrix} \lambda_3^2 + 2\lambda_3\mu_{32} + \mu_{32}^2 + \\ \lambda_2\mu_{32} - \lambda_1\lambda_2 \end{pmatrix} \\ -\lambda_1\lambda_2\lambda_3(\mu_{41} + \mu_{32} + \lambda_3) \end{bmatrix} & \begin{bmatrix} \mu_{41}\begin{pmatrix} \lambda_3^2 + \mu_{32}^2 + 2\lambda_3\mu_{32} + \\ \mu_{41}(\lambda_3 + \mu_{32}) + \lambda_2\mu_{32} \\ -\lambda_1\lambda_2 \end{pmatrix} \\ -\lambda_1\lambda_2\lambda_3 \end{bmatrix} & [\mu_{41}(\lambda_3 + \mu_{32})] \\ \begin{bmatrix} \mu_{41}^2(\lambda_1 + \lambda_2 + \lambda_3 + \mu_{32} + \mu_{21}) \\ -\lambda_1\lambda_2\lambda_3 \end{bmatrix} & \begin{bmatrix} \mu_{41}\begin{pmatrix} \mu_{41} + \lambda_1 + \lambda_2 + \lambda_3 \\ +\mu_{32} + \mu_{21} \end{pmatrix} \end{bmatrix} & [\mu_{41}] \\ \begin{bmatrix} \lambda_1\lambda_2 + \lambda_1\lambda_3 + \lambda_2\lambda_3 + \lambda_1\mu_{32} + \lambda_3\mu_{21} \\ +\mu_{41}(\lambda_1 + \lambda_2 + \lambda_3 + \mu_{32} + \mu_{21}) \\ +\mu_{32}\mu_{21} \end{bmatrix} & \lambda_1 + \lambda_2 + \lambda_3 + \mu_{41} \\ +\mu_{32} + \mu_{21} & [1] \end{pmatrix}$$

and $$K_P = \lambda_1 + \lambda_2 + \lambda_3 + \mu_{21} + \mu_{32} + \mu_{41}$$

$$\Lambda_P = \mu_{41}(\lambda_1 + \lambda_2 + \lambda_3 + \mu_{32} + \mu_{21}) + \mu_{21}\mu_{32} + \lambda_3\mu_{21} + \lambda_1\mu_{32} + \lambda_2\lambda_3 + \lambda_1\lambda_3 + \lambda_1\lambda_2$$

$$\Omega_P = \mu_{41}(\mu_{21}\mu_{32} + \lambda_3\mu_{21} + \lambda_1\mu_{32} + \lambda_2\lambda_3 + \lambda_1\lambda_3 + \lambda_1\lambda_2) + \lambda_1\lambda_2\lambda_3$$

$$D(a_i) = 3a_i^2 + 2a_i K_P + \Lambda_P$$

where the $a_i$ are solutions to $$a_i^3 + a_i^2 K_P + a_i \Lambda_P + \Omega_P = 0$$

which are $$a_1 = \left(\Theta_p - \frac{\omega_p}{\Theta_p}\right) - \frac{1}{3}K_p = -\left[\left(\frac{\omega_p}{\Theta_p} - \Theta_p\right) + \frac{1}{3}K_p\right]$$

$$a_2 = \frac{1}{2}\left[\frac{\omega_p}{\Theta_p} - \Theta_p\right] - \frac{1}{3}K_p - i\frac{\sqrt{3}}{2}\left\{\frac{\omega_p}{\Theta_p} + \Theta_p\right\}$$

$$a_3 = \frac{1}{2}\left[\frac{\omega_p}{\Theta_p} - \Theta_p\right] - \frac{1}{3}K_p + i\frac{\sqrt{3}}{2}\left\{\frac{\omega_p}{\Theta_p} + \Theta_p\right\}$$

where $$\kappa_P = (1/27 K_P^3 - 1/6 K_P \Lambda_P + 1/2 \Omega_P)$$

$$\omega_P = (1/3 \Lambda_P - 1/9 K_P^2) = 1/3(\Lambda_P - 1/3 K_P^2)$$

$$\Theta_P = \{\sqrt{\kappa_P^2 + \omega_P^3} - \kappa_P\}^{1/3}$$

With reference to Equation 1 and 520 of FIG. 11 with 528 remove, reliability for a RAID 6 group may be expressed as $R(t) = 1 - \pi_4(t)$, which, in terms of Equation 1 may be represented as $\Gamma E(t)$ where:

$$E(t) = \begin{pmatrix} 1 \\ e^{a_1 t} \\ e^{a_2 t} \\ e^{a_3 t} \end{pmatrix} \text{ and}$$

where $$D(a_i) = 3a_i^2 + 2a_i(\lambda_1 + \lambda_2 + \lambda_3 + \mu_{21} + \mu_{32}) + (\lambda_1\lambda_2 + \lambda_1\lambda_3 + \lambda_1\mu_{32} + \lambda_3\mu_{21} + \mu_{32}\mu_{21})$$

The coefficients $a_i$ are given by $$a_1 = -[\rho + 1/3 K_0]$$

$$a_2 = \tau - i\sigma$$

$$a_3 = \tau + i\sigma$$

where $$K_0 = (\lambda_1 + \lambda_2 + \lambda_3 + \mu_2 + \mu_3)$$

$$\Lambda_0 = (\lambda_1\lambda_2 + \lambda_1\lambda_3 + \lambda_2\lambda_3 + \lambda_1\mu_3 + \lambda_3\mu_2 + \mu_2\mu_3)$$

$$\Omega_0 = \lambda_1\lambda_2\lambda_3$$

$$\kappa = (1/27 K_0^3 - 1/6 K_0 \Lambda_0 + 1/2 \Omega_0)$$

$$\overline{\omega} = (1/3 \Lambda_0 - 1/9 K_0^2) = 1/3(\Lambda_0 - 1/3 K_0^2)$$

$$\Theta = \{\sqrt{\kappa^2 + \overline{\omega}^3} - \kappa\}^{1/3}$$

$$\rho = \frac{\overline{\omega}}{\Theta} - \Theta$$

$$\sigma = \frac{\sqrt{3}}{2}\left(\frac{\overline{\omega}}{\Theta} + \Theta\right)$$

$$\tau = \frac{\rho}{2} - \frac{K_0}{3}$$

Returning now to FIG. 10, the foregoing may be used in calculating availability and reliability for a RAID group, and thus, one or more storage pools, in an embodiment in connection with techniques herein. After determining the initial candidate configuration as represented in 409 and its associated workload estimates in 404, processing may be performed in connection with performing an assessment for the candidate configuration in accordance with assessment criteria including reliability and availability.

As a next step, an embodiment may determine rebuild times and rates in 407 and restoration times and rates in 406. A rebuild time may be determined for each physical device in $$\Gamma = \begin{pmatrix} [0] & \left[\frac{(\lambda_2\lambda_3 + \lambda_3\mu_{21} + \mu_{21}\mu_{32}) + a_1\binom{\lambda_2 + \lambda_3 + \mu_{21}}{+\mu_{32}} + a_1^2}{D(a_1)}\right] & \left[\frac{(\lambda_2\lambda_3 + \lambda_3\mu_{21} + \mu_{21}\mu_{32}) + a_2\binom{\lambda_2 + \lambda_3 + \mu_{21}}{+\mu_{32}} + a_2^2}{D(a_2)}\right] & \left[\frac{(\lambda_2\lambda_3 + \lambda_3\mu_{21} + \mu_{21}\mu_{32}) + a_3\binom{\lambda_2 + \lambda_3 + \mu_{21}}{+\mu_{32}} + a_3^2}{D(a_3)}\right] \\ [0] & \left[\frac{\lambda_1(\lambda_3 + \mu_{32} + a_1)}{D(a_1)}\right] & \left[\frac{\lambda_1(\lambda_3 + \mu_{32} + a_2)}{D(a_2)}\right] & \left[\frac{\lambda_1(\lambda_3 + \mu_{32} + a_3)}{D(a_3)}\right] \\ [0] & \left[\frac{\lambda_1\lambda_2}{D(a_1)}\right] & \left[\frac{\lambda_1\lambda_2}{D(a_2)}\right] & \left[\frac{\lambda_1\lambda_2}{D(a_3)}\right] \\ [1] & \left[\frac{\binom{\lambda_1\lambda_2 + \lambda_1\lambda_3 + \lambda_2\lambda_3}{+\lambda_1\mu_{32} + \lambda_3\mu_{21}} + a_1\binom{\lambda_1 + \lambda_2 + \lambda_3}{+\mu_{32} + \mu_{21}} + a_1^2}{D(a_1)}\right] & \left[\frac{\binom{\lambda_1\lambda_2 + \lambda_1\lambda_3 + \lambda_2\lambda_3}{+\lambda_1\mu_{32} + \lambda_3\mu_{21}} + a_1\binom{\lambda_1 + \lambda_2 + \lambda_3}{+\mu_{32} + \mu_{21}} + a_2^2}{D(a_2)}\right] & \left[\frac{\binom{\lambda_1\lambda_2 + \lambda_1\lambda_3 + \lambda_2\lambda_3}{+\lambda_1\mu_{32} + \lambda_3\mu_{21}} + a_1\binom{\lambda_1 + \lambda_2 + \lambda_3}{+\mu_{32} + \mu_{21}} + a_3^2}{D(a_3)}\right] \end{pmatrix}$$

a RAID group. From this, a rebuild time may be determined for the entire RAID group and storage pool including one or more such RAID groups. Rebuild times and rates may be used in determining reliability. Rebuild times and rates, in combination with restoration times and rates, may be used in determining availability.

Figure 12:
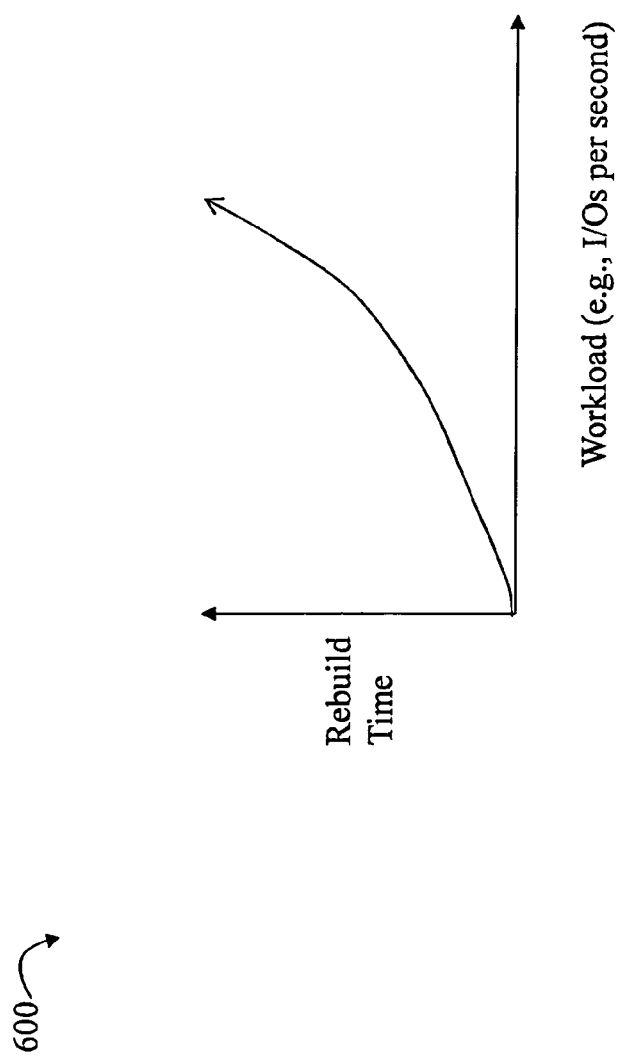
FIG. 12 is an example of a rebuild characteristic curve as may be used in an embodiment in accordance with techniques herein.

Rebuild time may be characterized as a function of workload (e.g., process incoming received I/Os while performing an internal RAID group rebuild) and any system specific settings. The system specific settings may include, for example, prioritization or bias to performing rebuild over I/O processing (or vice versa), not allowing any incoming I/Os during rebuild, aspects related to service and spare devices, as described in more detail elsewhere herein, and the like. With reference to FIG. 12, shown is an example of a characteristic curve for rebuild times for a physical storage device whereby the curve expresses rebuild time determined as a function of workload for a particular type of storage media included as a member drive in a particular RAID level and group configuration (e.g., RAID 1, RAID 5(3+1), RAID5 (7+1), and the like). An embodiment may determine a different curve as illustrated in 600 for each storage tier or rather each combination of storage media type, RAID level and group configuration. Rebuild time for a storage tier having a particular RAID group configuration and type of storage media may be represented as:

$$\sum_{r=0}^{n} A_r W^r \qquad \text{Equation 8}$$

where $W^r$ is the workload such as typically measured in number of I/Os per unit of time such as I/Os per second;

$A_r$ is a function representing observed or modeled data for determining a rebuild time (Y axis) for different workload values (e.g., X axis for different values of I/Os second or other workload metric) for a fixed set of parameters (e.g., such as related to storage media type, RAID level and configuration, capacity, and the like) characterizing the storage media for which a rebuild is performed;

r is the exponent or power dependent used to describe the particular curve being used; and n=maximum power or exponent that may be used to described any such curve for this drive or another drive as may be derived from observed data.

It should be noted that both "r" and "n" may be characterized as an exponential power that varies with the particular equation (e.g., polynomial, quadratic, etc.) or curve fitting the observed or modeled data. Note that if r is zero, the effect of the $W^r$ term for the workload impact is 1. Additionally, an embodiment may use different curves such as illustrated in FIG. 12 to take into account different dependencies as may vary with system such as, for example, availability of spare, physical location of a spare (e.g., in same physical disk enclosure, same physical site, remotely located such as over network or other connection to another data storage system including the spare), and the like with a single curve instance for each unique combination of factors considered.

Under conditions where the system has no workload (e.g. no IOPS activity), the storage media may take the shortest time to rebuild, which in this embodiment has for the storage media illustrated here typical rebuild times respectively. Rebuild times are known to be different for each type of storage medium. However, as noted above, under real-world conditions, one may further modify or customize such rebuild times to take into account any suitable and desired factors in addition to workload. Such additional factors, as noted above and described elsewhere herein, that may be considered when determining rebuild time may further include data represented by 403 such as the firmware code and its version number (e.g., as different ones may affect the rate at which processing is performed such as may be due to whether a particular version includes a speed performance optimization, and the like), various settings such as related to I/O vs. rebuild prioritization, aspects related to a spare device, service level aspects 408, and the like.

In distinction to the rebuild time, a restore time is also determined for a pool. The user may collect information pertaining to restore time in 406 of the pool should any single RAID group in the pool experience a sufficient number of drive faults to thereby cause any single RAID group to transition to the DUDL (down) state. As described elsewhere herein, such a DUDL event would be, for example, the failure of two physical devices in an N+1 protection scheme such as RAID5 within the pool. In this case the data must be restored from some external source such as tape backup or a remote clone site using for example RDF (remote data facility) manufactured by EMC Corporation. The restore time is required to complete availability calculations 411. In this case, all the affected data in the pool must be copied back, and consequently the restore time is different from the rebuild time. Whereas rebuild time, as one skilled in the art may know, affects the probability (i.e. risk) of system failure which occurs as aforesaid when sufficient multiple faults occur at the same time to cause a general pool failure, restore time influences the relative availability of the system. This measure of restore time is important where specific availability levels and/or restore times are a desired goal.

In an embodiment, the techniques herein and tool embodying such techniques may ensure that restore time is limited to within a specific target time. This target time may also be referred to either as the Recovery Time Objective or Restore Time Objective (RTO). Furthermore, an embodiment in accordance with techniques herein may specify an RTO which may be used to determine repair rates or μ's associated with 516b, 528a representing restoration rates. The rate of restoration used for 516b, 528a may be 1/restore time where restore time may be the RTO. Thus, an embodiment may provide for specifying a given RTO, using this RTO as the restoration time with a particular configuration and then determining whether the configuration having this RTO meets reliability and availability thresholds for one or more storage pools. The embodiment may also determine a particular RTO for a given availability and then compare the calculated RTO to a desired goal to determine whether it is achieved.

It should be noted that the various suitable factors herein that have been noted as affecting rebuild time may also be taken into consideration when determining restoration time.

With reference to FIG. 11, to determine reliability and availability based on the Markovian model as described herein, various rates of repair, μ's, and rates of failure, λ's, are used. The rate of repair (to return to UP state 512, 522) is either based on restoration time (if transitioning from a current state 516 or 528), or a rebuild time (if transitioning from a current state 514, 524 or 526). The foregoing restoration and rebuild times may be used to determined the needed rates of repair μs. Rate of repair may consider whether there is a spare drive available for rebuild (e.g., such as by considering additional service time to acquire a spare if a service technician is needed to bring one on site) and may be represented as:

rate of repair μ=(1−e)/(REPAIR time+service time)+ e/REPAIR time  Equation 9 where

"e" is the chance or probability that a failed drive has a spare available;

"REPAIR time" is either rebuild time or restore time depending on the particular transition rate being determined; and "service time" is the time to obtain a spare if there is no spare drive available in order to proceed with a rebuild or restore. As noted elsewhere herein, service time may vary with service level of an existing contract such as guaranteed amount of time to perform the necessary service of obtaining the drive. The entire first term (e.g., (1−e)/(REPAIR time+service time)) in the above Equation 9 relates to the rate of repair if there is no spare available and the second term (e.g., e/REPAIR time) in the above Equation 9 relates to the rate of repair if there is a spare available.

Values for λ's denoting the rates of failure may be determined using the MTTF or mean time to failure associated with physical drives in the RAID group. For example, with reference to FIG. 1, the following may be used:

$$\lambda 1 = NUM\_RAID/MTTF \quad \text{Equation 10A}$$

$$\lambda 2 = \frac{(NUM\_RAID/(NUM\_RAID - 1))}{MTTF} \quad \text{Equation 10B}$$

$$\lambda 3 = (NUM\_RAID-2)/MTTF \quad \text{Equation 10C}$$

where NUM_RAID is the number of physical drives in each RAID group.

It should be noted that an embodiment may consider further aspects in connection with estimating rates for $\lambda_i$ (failure rate) and $\mu_{qr}$ (repair rate) For example, an embodiment may characterize use of a automatic sparing in connection with rebuild and restoration operations taking into account an efficiency level represented as "epsilon". In such a case, the rate of repair may be a weighted average of the times (not the rates) of repair. 1/MTTR (mean time to repair) may be used to determine a rate of repair for values of $\mu_{qr}$ where the MTTR may be represented as:

MTTR=epsilon*(time to rebuild spare drive with automatic sparing)+(1-epsilon)*(time to obtain replacement+replace time+time to rebuild)  Equation 11

Failure rates may be adjusted to take into account factors related to specific drive technologies. For example, SSDs having a particular number of writes may have a higher rate of failure than other SSDs having a lesser number of writes at the same location (i.e. known as device wearing). As such, suitable adjustments may be made to the failure rate proportionality to the write frequency expected in the use case. As another example in connection with mechanical disk device technologies, it is known that mechanical rotating disks may also suffer failures that may vary with usage, device quality issues, and the like. As such, wear out conditions related to age and/or frequency of use for a particular mechanical drive technology may also be taken into account when determining failure rates. For example, wear out conditions may be represented using Weibull curves may be used to determine appropriate increases to the failure rates approximated using techniques herein.

Figure 10:
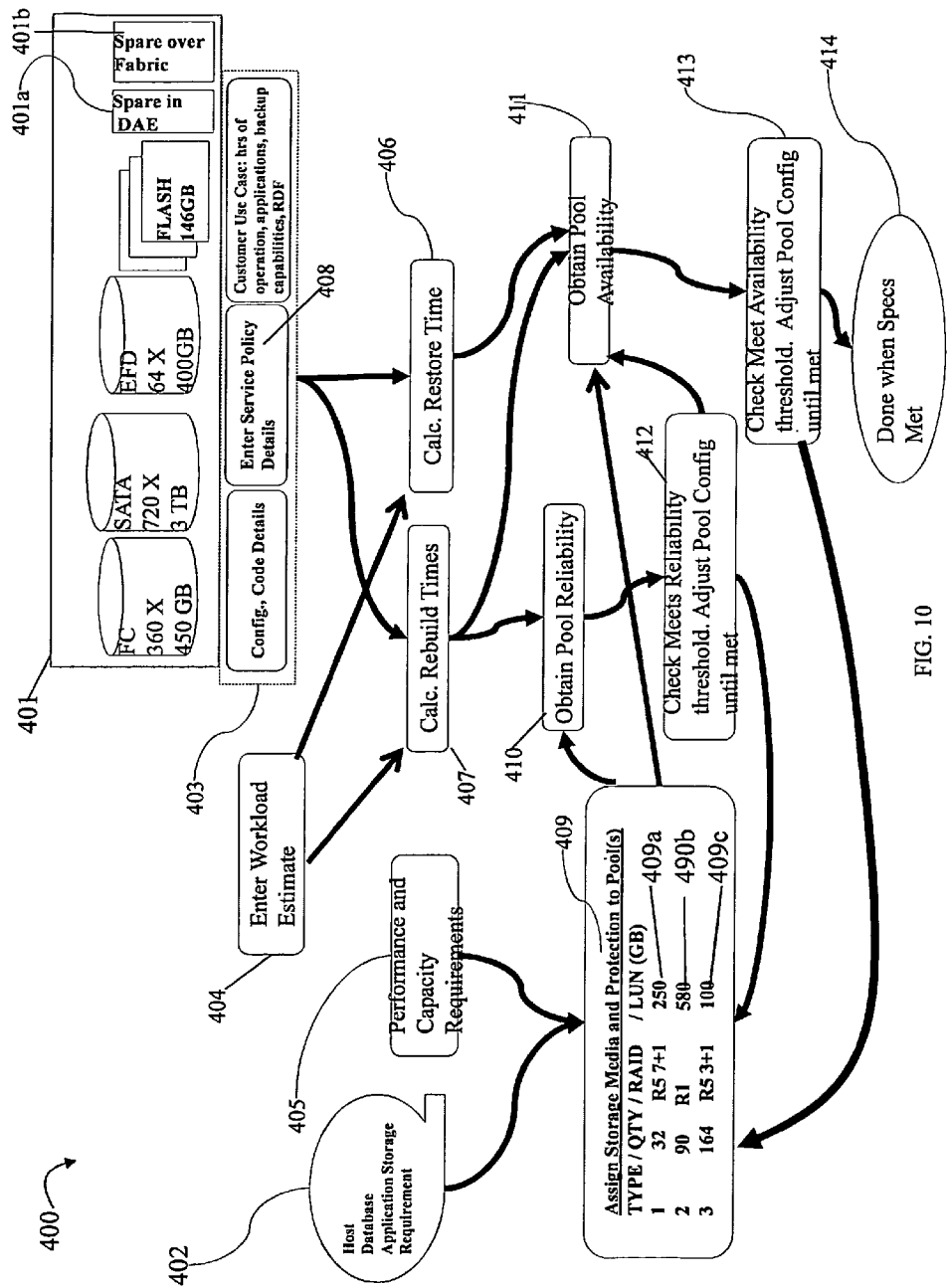
FIG. 10 is an example illustrating data flow processing and various inputs and outputs of processing steps as may be used in connection with an embodiment in accordance with techniques herein.

With reference to FIGS. 10 and 11, once the various rates for repair μ and failure λ are determined, the reliability for a storage pool may be determined based on the RAID-group level reliability calculations for one or more RAID groups having different storage media types in the storage pool. As noted elsewhere herein, unreliability at a time t is the probability of being in state π3(t) (e.g., 516) for RAID 5 and RAID 1 and π4(t) (e.g., 528) for RAID 6. Since the sum of all probabilities πi for all i states is 1 as in Equation 2, reliability at a time t may be expressed as 1−probability of unreliability at the time t such as represented by 1−π3(t). For a given storage pool, the reliability/unreliability may be determined for each RAID group of each storage tier in the pool. Subsequently, these reliability/unreliability values may be combined (e.g., across storage tiers of devices included in the storage pool) to determine a reliability/unreliability for the storage pool. The probability of the pool being in the down state is dependent on any single RAID group in the pool (e.g., one or more RAID groups of the pool) being in the down/DUDL state. The probability of the pool being down may be expressed as the probability of one or more RAID groups of a type j being in the DUDL or down state.

As noted above, pools may be composed of a plurality of physical device types where each set of the said physical device types is subdivided into a plurality of independent RAID groups. If each physical device type has quantity $N_j$, RAID groups for any tier composed of device type j with probability $\pi_{gi}$ of being in state g, the number of RAID groups in the state g may be determined from the product $N_j \pi_{gi}$, with a probability $p_{gi}(t)$ of being in said state given by the binomial theorem and represented as:

$$p_{gi}(t) = 1 - C\binom{N_j}{0}(1 - \pi_{gj}(t))^{N_j} \quad \text{Equation 12}$$

(i.e. which is effectively the (1−probability of none being in the state g).)

One or more RAID groups in the pool may be in the DUDL state for the RAID group (e.g., 516 or 528) thereby causing the DUDL state for any given pool. Consequently, the probability of being in said DUDL state for one pool (pool_down) may be determined to be $$p(\text{pool\_down}; t) = \sum_{j=1}^{n_j} p_{gj}(g = g_j : DUDL; t) -$$
$$\sum_{j,k; \neq j} p_{gj}(i = i_j : DUDL; t) p_{gk}(i = i_k : DUDL; t) +$$
$$\ldots \sum_{j,k,l; j \neq k \neq l} p_{gj}(g = g_j : DUDL; t) p_{ik}(g = g_k : DUDL; t) p_{gl}(g = g_l : DUDL; t) - \ldots$$

Equation 13 where $\{g_j, g_k, g_l\}$ are the DUDL states for each tier of device types in the pool. The series may be expanded beyond the three tiers (j,k,l) in the standard way of adding independent probabilities where any one or more RAID groups in any tier may cause the pool to enter the DUDL or down state. The pool reliability calculation p(pool_down; t) as represented in Equation 13 may be regarded as the risk of pool failure or unreliability at time t. In these calculations generally the reliability calculation is used to estimate the pool failure risk or unreliability for each tier in the pool.

In a similar manner as described above for reliability with respect to a storage pool, an availability calculation may determined for the storage pool using the additional rates of failure as denoted by 516b and 528a of FIG. 11.

It should be noted that, as described herein when determining rebuild rates, software coverage rates may be taken into account where the software coverage in this context relates to the probability that software performing the rebuild successfully completes the rebuild operation (e.g., to rebuild the failed drive of the RAID group using internal RAID-group rebuild processes). With reference to FIG. 11, the probability of software coverage may be taken into account using modified values for the $\mu$'s and $\lambda$'s where each $\mu$ is replaced with $\mu'=c\mu$, where c is the rebuild software coverage factor, and each of the $\lambda i$'s of FIG. 11 are now represented as $\lambda i+(1-c)\mu_{j,i}$, where j denotes the source state of the transition and i denotes the target state of the transition. An embodiment may also include an additional transition in the representation 520 of FIG. 11 in connection with a RAID-6 group, where the additional transition is from state 524 to state 528, having the rate, $\lambda, =(1-c)\mu_{41}$.

Additionally, in connection with determining the various Markov calculations as described herein affecting failure rates (e.g., $\lambda$s) and rebuild and restore rates (e.g., $\mu$'s), various aspects of service faults may be taken into account such as, for example, performing a manual (e.g., human touching) operation to a component of the system where human error may occur such as, for example, with drive replacement.

With reference to step 410 of FIG. 10, the reliability calculated may be for a single storage pool if the configuration under analysis includes a single pool. Otherwise, a net reliability may be determined that is a combination of reliability calculations for all storage pools in the configuration being assessed such as by adding independent probabilities associated with such multiple storage pools.

Once reliability is determined in step 410, it may be used as an input in to step 412 where a determination is made as to whether the reliability for the current configuration meets a reliability threshold. If the reliability for the current configuration does not meet the desired threshold, control may be returned to step 409 to adjust the pool configuration and repeat processing as described above to reassess the modified or adjusted pool configuration. Otherwise, control may proceed to step 411.

With reference to step 411 of FIG. 10, the availability calculated may be for a single storage pool if the configuration under analysis includes a single pool. Otherwise, a net availability may be determined that is a combination of availability calculations for all storage pools in the configuration being assessed such as by adding independent probabilities associated with such multiple storage pools. Once availability is determined in step 411 for the current configuration, it may be used an input in to step 413 where a determination is made as to whether the availability for the current configuration meets an availability threshold. If the availability for the current configuration does not meet the desired threshold, control may be returned to step 409 to adjust the pool configuration and repeat processing as described above to reassess the modified or adjusted pool configuration. Otherwise, control may proceed to step 414.

With reference now to FIG. 13, shown is an example representing one user interface that may be used in connection with an assessment tool utilizing techniques described herein. The example 800 includes a first set of information of table 830 displaying storage pool configuration information such as a first candidate configuration in connection with 409 of FIG. 10. The user inputs the foregoing configuration information, selects calculate button 831 and the assessment tool having this displayed interface may then perform assessment calculations such as related to unreliability, unavailability and availability as included, respectively in columns 837a, 838a, and 839a. Additional information of 830 such as 833a may also be displayed as results from the assessment tool. In this example, such calculated values presented may be for each storage tier and also as net values for reliability 831a and availability 832a. In this instance the reliability and availability are presented as numbers from which the user may determine that neither net reliability 831a nor net availability 832a requirements are met. The user may modify the current configuration to an alternative candidate configuration. In forming this alternative or revised candidate configuration, the user may utilize the displayed information of 430. In particular, the user is presented with a risk ranking of the storage media types or storage tiers 833a where the "1" represents (in this particular embodiment) the tier of storage media with the highest risk 833a in results 830). The user can clearly note the highest risk contributors are the 3TB SATA devices in the pool 830a, and probabilities of failure values for the risk are presented in 837a which can be inspected. Using this information, the user may decide to upgrade the RAID for this storage tier 830a to higher protection. Additionally, the user may decide to compensate for the subsequent loss of performance due to this RAID upgrade, as generally one familiar with the art knows that increasing RAID protection may increase latency. One means to overcome this performance decrease due to increased latency is to reduce the LUN size 835a and spread the data over more devices thereby giving greater parallelism for IOPS to these devices on this engine. The user may input this revised configuration as displayed in 840 and may select 841. On recalculating, revised results are displayed in 840 such as included in columns 837b, 838b, 839b and 833b respectively for unreliability, unavailability, availability and a risk ranking of storage tiers. Based on the displayed values goals or thresholds for availability and reliability may be met by this revised configuration of 840.

Figure 14:
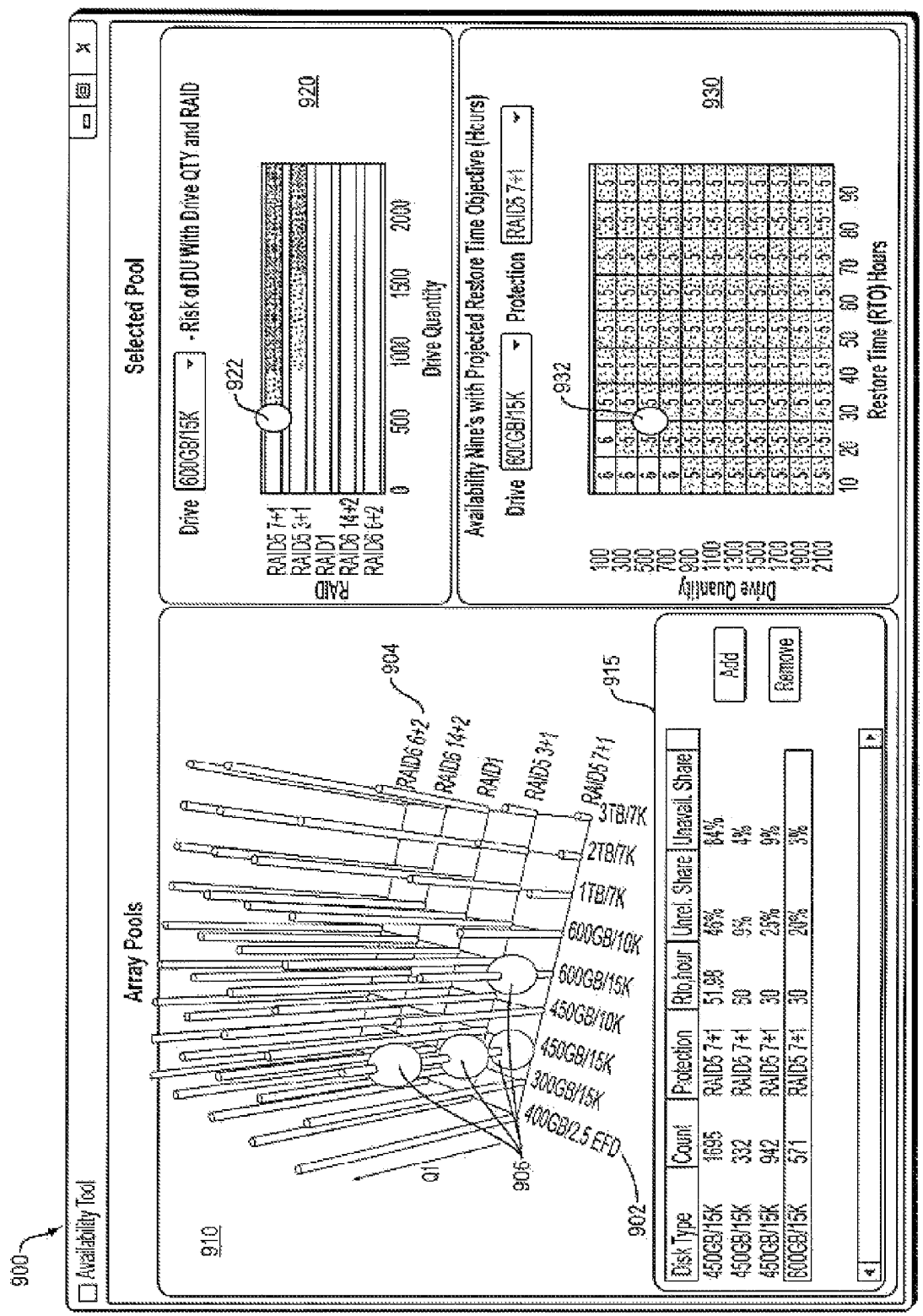

Referring to FIG. 14, shown is another example of a UI display that may be used in an embodiment in connection with techniques herein. The example 900 includes a UI display having portions 910, 915, 920 and 930. In area 910, a user may specify a candidate configuration for assessment using the techniques herein. The area 910 provides a three dimensional display with device types indicated on the X-axis 902, various RAID levels and RAID configurations indicated on the Y-axis 904 and a quantity as the number of drives and capacity for the configuration denoted by moving balls 906 of various bars in the Z dimension as represented by Q1. Other information corresponding to the selected configuration of 910 may be displayed in 915, 920 and 930. In this example, the configuration may be for a single storage pool including multiple RAID groups having a same RAID level and RAID configuration. Element 920 may include a color coded display of the risk or unreliability associated with various combinations of RAID groups (Y axis) and drive quantities (X-axis). The ball 922 may indicate the current position of 920 for the particular candidate configuration having the configuration represented by 910, 915. Element 930 may include information related to availability of a pool configuration having a particular RTO (X axis) and drive quantity (Y-axis). The ball 932 may indicate the position in the display 930 corresponding to that of the selected configuration of 910 (e.g., indicating that the current configuration has a corresponding availability of five "nines". The threshold level of acceptable availability may be indicated by color coding different levels of availabilities (e.g., five "nines" encoded with a first color or visual indicator displayed that is different from a second color or visual indicator displayed for six "nines")

Figure 15:
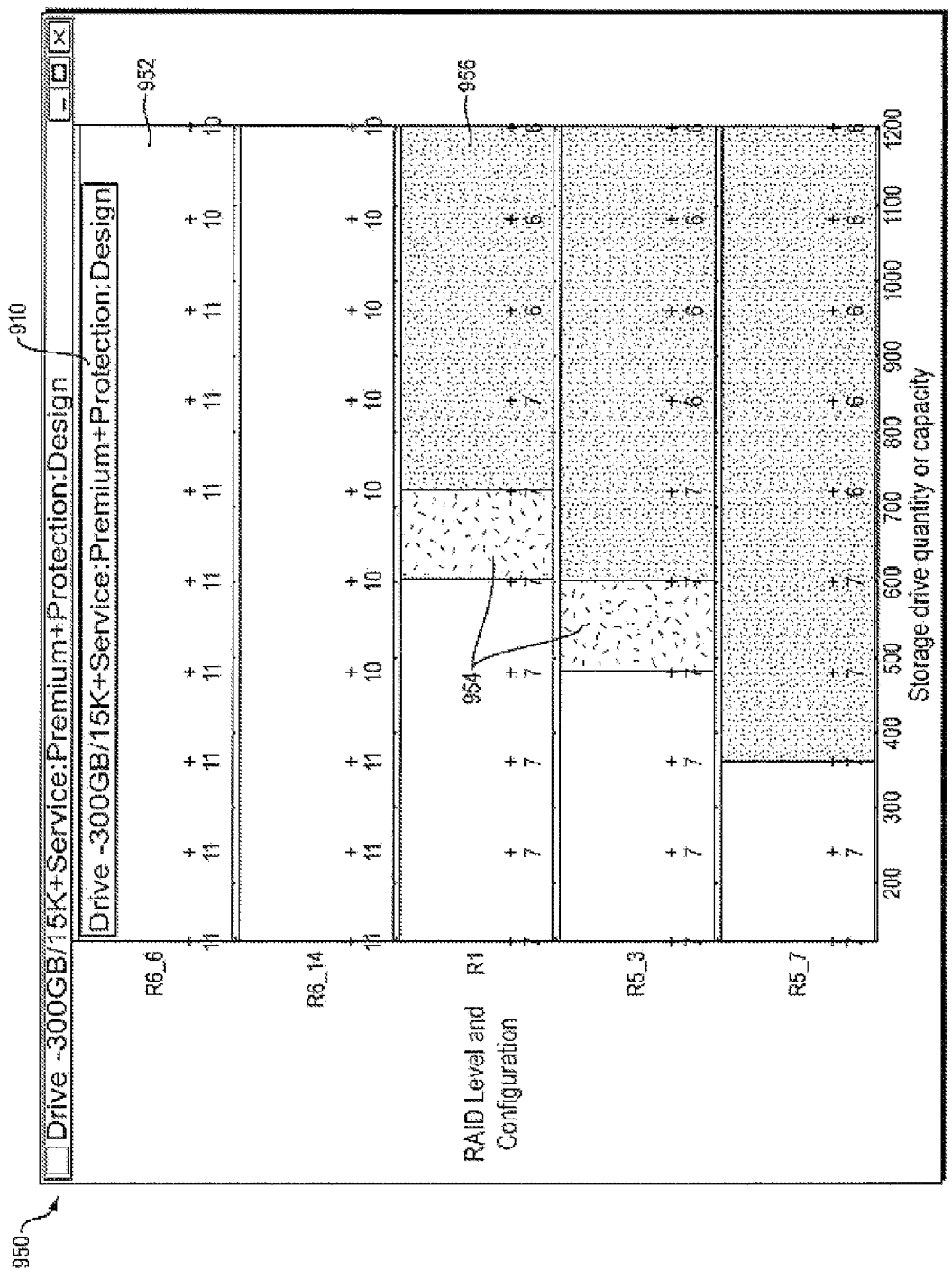

Referring to FIG. 15, shown is an example of another UI display that may be used in connection with an embodiment in accordance with techniques herein. The example 950 illustrates a display for a particular storage media type 910 such as a 15K RPM 300 GB FC disk drive for varying combinations of RAID level and RAID configuration (Y-axis) and storage drive quantities or capacities (X-axis). The example 950 illustrates that, for a particular storage drive quantity or capacity configured in a particular RAID level and configuration, the associated unreliability or risk may be displayed via a color coding in combination with an associated availability as indicated by the numeric displayed (e.g., +6, +7, +10 or +11 indicating a number of "nines" of availability). In this example, the risk or unreliability level may be partitioned into three color codings based on two thresholds. A first threshold may be defined as indicating a good or acceptable level of risk or unreliability where it is desirable to have a level of risk or unreliability below this threshold (e.g., also representing that the configuration has a reliability within a good or acceptable threshold since the probability indicating reliability is equal to 1—the probability indicating unreliability or risk). Configurations having this acceptable level of risk above the first threshold are denoted as in 952 by the white and denote those configurations have risk levels within best practices for typical customer requirements.

A second threshold may be defined as indicating a level of risk or unreliability greater than the first threshold. The second threshold may represent, for example, a relaxed risk requirement, for example, where data loss to the customer may not threaten continuing business operations such as for test systems, or more generally, where such data stored on devices in configurations of this relaxed risk level is ephemeral, of low value, and may be easily replaced. Such a relaxed risk requirement allowing for an increased level of risk or unreliability may also be used in circumstances where the customer can guarantee failover to a redundant remote system upon a the occurrence of a DUDL event. Configurations having this relaxed level of risk (e.g., above the first threshold's risk level but at or below the second threshold's risk level) may be denoted as in 954 by the grey coding to denote those configurations having such a relaxed risk level. Those configurations having a risk level above the second threshold may be denoted as in 956 by the black coding and may indicate an unacceptable risk level. Those configurations having such black color coding 956 may not be recommended configurations thereby indicating that the associated configuration has, for example, a double or more the normal risk of data loss. An embodiment may use other color coding schemes or visual indicators to denote boundaries or thresholds of associated risk/unreliability levels.

Figure 16:
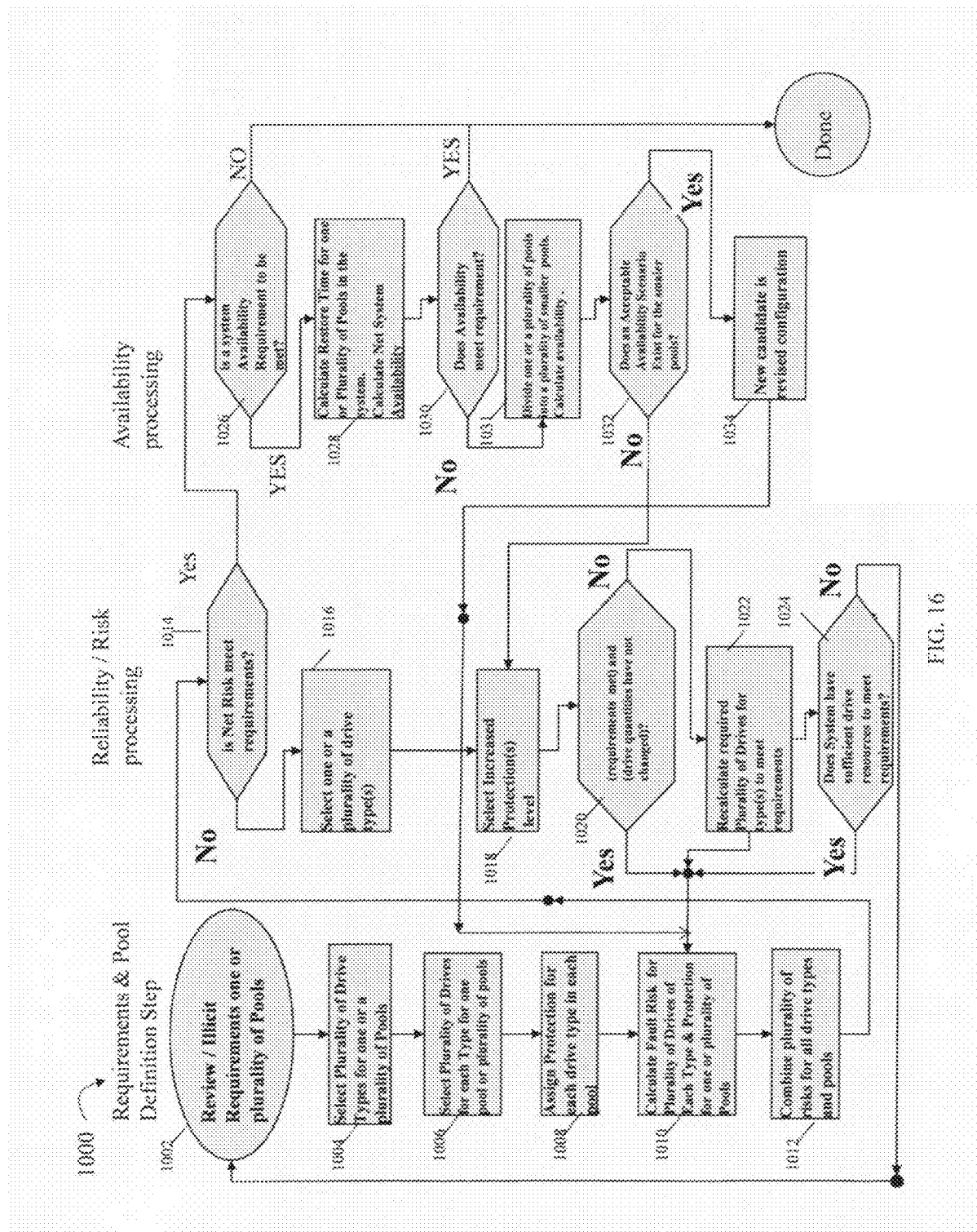

Referring to FIG. 16, shown is a flowchart of processing steps as may be performed in an embodiment in accordance with techniques herein. The example 1000 provides additional detail in comparison to the flowchart of FIG. 9 and summarizes such detailed processing as described above. In step 1002, the user may obtain and review requirements for one or more storage pools for which configurations will be assessed by processing of 1000. Such requirements may include, for example, performance and capacity requirements. At step 1004, one or more device or storage medium types are selected. At step 1006, a number of drives of each type from 1004 are selected. At step 1008, a protection such as a RAID level and RAID configuration are assigned to each drive type in the pool(s) under configuration. At step 1010, a risk or unreliability value is determined for the plurality of drives of a storage tier (e.g., storage tier being represented by a combination of device type and RAID protection level and configuration) for each pool. At step 1012, the risks or unreliabilities for all drive types and all pools are combined to determine a net risk or unreliability (which may also be expressed as a complementary level of net reliability) for all drive types and pools. At step 1014, a determination is made as to whether the net risk or unreliability meets risk requirements. Step 1014 may also be expressed as determining whether the calculated risk or unreliability for the current configuration being assessed is greater than an acceptable threshold level of risk. Alternatively, step 1014 may also be expressed as a determination as to whether the net reliability is greater than an acceptable level of reliability. If step 1014 determines that the risk or requirements related to reliability/unreliability are not met, control proceeds to step 1016 where processing begins to determine an alternative configuration. At step 1016, one or more drive types are selected. At step 1018, an increased level of protection by a different RAID level may be selected. At step 1020, a determination may be made as to whether requirements (e.g. such as pool capacity and performance requirements of step 1002) are still met and whether drive quantities have/have not changed. It should be noted that drive quantities may have changed due to the increased RAID protection level. If all the requirements are still met and the drive quantities have not changed, step 1020 evaluates to yes and control proceeds to step 1010. If step 1020 evaluates to no (e.g., if any one or more requirements are no longer met, or drive quantities have changed), control proceeds to step 1022 to recalculate the required drives to meet with requirements in combination with the increased RAID protection level. At step 1024, a determination is made as to whether the system has sufficient physical device resources to meet the amount determined in step 1022. If step 1024 evaluates to yes, control proceeds to step 1010. Otherwise, control proceeds from step 1024 to step 1002 to revise/review the requirements.

If step 1014 determines that the risk or requirements related to reliability/unreliability are met, control proceeds to step 1026 where a determination is made as to whether an availability requirement is to also be met. If step 1026 evaluates to no, control proceeds to done. If step 1026 evaluates to yes, control proceeds to step 1028 where a restore time is determined for the one or more storage pools and a net availability is determined. At step 1030, a determination is made as to whether the net availability for the configuration meets availability requirements such as may be specified using an availability threshold. If step 1030 evaluates to yes, control proceeds to done. If step 1030 evaluates to no, control proceeds to step 1031 to determine an acceptable alternative configuration where one possibility for such an alternative configuration may include partitioning one or more of the pools of the current configuration into smaller storage pools. Step 1031 may also include recalculating availability for the alternative configuration to determine whether the alternative configuration achieves the availability requirements. At step 1032, a determination is made as to whether the alternative configuration meets the availability requirements. If step 1032 evaluates to yes, control proceeds to step 1034 to make the alternative configuration the new candidate and then to step 1010. If step 1032 evaluates to no, control proceeds to step 1018.

With reference to FIG. 16, it should be noted that the first column of steps provides further detail regarding the requirements and pool configuration definition such as illustrated in connection with 402, 405 and 409 of FIGS. 10 and 352 of FIG. 9. The second column of steps of FIG. 16 provides further detail regarding the reliability/risk assessment steps such as illustrated in connection with 410, 412 of FIGS. 10 and 356, 358 of FIG. 9. The third column of steps of FIG. 16 provides further detail regarding the availability assessment steps such as illustrated in connection with 411, 413 of FIGS. 10 and 360, 362 of FIG. 9.

In connection with techniques herein, it should be noted that generally increasing the number of RAID groups in a pool causes reliability for the pool to decrease and availability to increase. Also, if there is decrease in the number of RAID groups in a pool, reliability tends to increase but availability tends to decrease.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of selecting a storage pool configuration comprising:
   determining a set of one or more candidate storage pool configurations;
   performing, for each of the candidate storage pool configurations of the set, a reliability calculation to determine a reliability value indicating reliability of said each candidate storage pool configuration;
   performing, for each of the candidate storage pool configurations of the set, an availability calculation to determine an availability value indicating availability of said each candidate storage pool configuration; and
   selecting, in accordance with selection criteria, one of the candidate storage pool configurations of the set for a first storage pool, said selection criteria including said availability value and said reliability value for each of said plurality of candidate storage pool configurations, and wherein said selecting further comprises:
   determining that said reliability value for said one candidate storage pool configuration represents a level of storage pool reliability that is greater than an acceptable reliability threshold; and
   determining that said availability value for said one candidate storage pool configuration represents a level of storage pool availability that is greater than an acceptable availability threshold.

2. The method of claim 1, wherein the selection criteria includes any of performance and cost.

3. The method of claim 1, wherein each of the one or more candidate storage pool configurations includes one or more RAID group configurations, each of said one or more RAID group configurations including a plurality of physical storage devices of one of a plurality of different types of storage media.

4. The method of claim 3, wherein the plurality of different types of storage media include solid state storage device media and one or more types of different rotating disk media.

5. The method of claim 1, further comprising providing a user interface that displays, for a storage pool including a set of physical drives of a particular type, different combinations of reliability and availability in accordance with different storage pool configurations for the storage pool, the different storage pool configurations being based on a RAID level, a RAID group configuration for the RAID level, and total storage capacity of the set of physical drives in the storage pool, wherein for each of said different storage pool configurations, a first visual indicator indicates availability of the storage pool in said each different storage pool configuration and a second visual indicator indicates reliability of the storage pool in said each different storage pool configuration, said first visual indicator being displayed to overlay said second visual indicator on a display area.

6. A method of selecting a storage pool configuration comprising:
   determining a set of one or more candidate storage pool configurations;
   performing, for each of the candidate storage pool configurations of the set, a reliability calculation to determine a reliability value indicating reliability of said each candidate storage pool configuration;
   performing, for each of the candidate storage pool configurations of the set, an availability calculation to determine an availability value indicating availability of said each candidate storage pool configuration; and
   selecting, in accordance with selection criteria, one of the candidate storage pool configurations of the set for a first storage pool, said selection criteria including said availability value and said reliability value for each of said plurality of candidate storage pool configurations, wherein each of the one or more candidate storage pool configurations includes one or more RAID group configurations, each of said one or more RAID group configurations including a plurality of physical storage devices of one of a plurality of different types of storage media, wherein the plurality of different types of storage media include solid state storage device media and one or more types of different rotating disk media, and wherein said one candidate storage pool configuration includes a plurality of RAID groups, and the method further comprising:
   determining, for each portion of said plurality of RAID groups having a same type of storage media, a first availability value indicating a combined availability for said each portion; and
   determining a storage pool availability indicating an availability for said one candidate storage pool based on one or more of said first availability values.

7. The method of claim 6, wherein a first RAID group in said each portion includes physical storage devices of a first type of storage media having a first RAID group configuration and first RAID protection level and a second RAID group in said each portion includes physical storage devices of the first type of storage media having a second RAID group configuration and a second RAID protection level, wherein said first RAID protection level differs from said second RAID protection level and/or said first RAID group configuration differs from the second RAID group configuration.

8. A method of selecting a storage pool configuration comprising:
   determining a set of one or more candidate storage pool configurations;
   performing, for each of the candidate storage pool configurations of the set, a reliability calculation to determine a reliability value indicating reliability of said each candidate storage pool configuration;
   performing, for each of the candidate storage pool configurations of the set, an availability calculation to determine an availability value indicating availability of said each candidate storage pool configuration; and selecting, in accordance with selection criteria, one of the candidate storage pool configurations of the set for a first storage pool, said selection criteria including said availability value and said reliability value for each of said plurality of candidate storage pool configurations, wherein each of the one or more candidate storage pool configurations includes one or more RAID group configurations, each of said one or more RAID group configurations including a plurality of physical storage devices of one of a plurality of different types of storage media, wherein the plurality of different types of storage media include solid state storage device media and one or more types of different rotating disk media, and wherein said one candidate storage pool configuration includes a plurality of RAID groups, and the method further comprising:

determining, for each portion of said plurality of RAID groups having a same type of storage media, a first reliability value indicating a combined reliability for said each portion; and determining a storage pool reliability indicating a reliability for said one candidate storage pool based on one or more of said first reliability values.

9. A method of selecting a storage pool configuration comprising:

determining a set of one or more candidate storage pool configurations;

performing, for each of the candidate storage pool configurations of the set, a reliability calculation to determine a reliability value indicating reliability of said each candidate storage pool configuration;

performing, for each of the candidate storage pool configurations of the set, an availability calculation to determine an availability value indicating availability of said each candidate storage pool configuration; and selecting, in accordance with selection criteria, one of the candidate storage pool configurations of the set for a first storage pool, said selection criteria including said availability value and said reliability value for each of said plurality of candidate storage pool configurations, wherein said first storage pool has a first storage pool availability and a first storage pool reliability, and wherein a second storage pool has a second storage pool availability and a second storage pool reliability, and the method further comprising:

determining, using said first storage pool availability and said second storage pool availability, a net availability indicating a combined availability for said first storage pool and said second storage pool; and determining whether said net availability represents a level of availability that is greater than an acceptable availability threshold.

10. The method of claim 9, further comprising:

determining, using said first storage pool reliability and said second storage pool reliability, a net reliability indicating a combined reliability for said first storage pool and said second storage pool; and determining whether said net reliability represents a level of reliability that is greater than an acceptable reliability threshold.

11. The method of claim 10, wherein if either said net reliability is not greater than the acceptable reliability threshold or said net availability is not greater than the acceptable availability threshold, determining that a combination of currently select storage pool configurations for the first storage pool and the second storage pool are unacceptable.

12. The method of claim 9, wherein if said net availability is not greater than the acceptable availability threshold, the method further includes:

partitioning said second storage pool into a plurality of smaller storage pools;

determining a small storage pool availability for each of said plurality of smaller storage pools;

determining a combined small pool availability using a plurality of small storage pool availabilities for said plurality of smaller storage pools;

determining, using said combined small pool availability and said first storage pool availability, a revised net availability indicating a combined availability for said first storage pool and said plurality of smaller storage pools; and determining whether said revised net availability represents a level of availability that is greater than an acceptable availability threshold.

13. The method of claim 10, wherein if said net reliability is not greater than the acceptable reliability threshold, the method further includes:

selecting one of said plurality of different types of storage media of drives included in a first RAID group of any of the first storage pool and the second storage pool;

selecting a revised RAID configuration providing an increased level of protection in comparison to a current RAID configuration for the first RAID group;

updating any of said first storage pool reliability and said second storage pool reliability in accordance with said revised RAID configuration;

determining a revised net reliability using the first storage pool reliability and the second storage pool reliability; and determining whether said revised net availability represents a level of availability that is greater than an acceptable availability threshold.

14. A method of selecting a storage pool configuration comprising:

determining a set of one or more candidate storage pool configurations;

performing, for each of the candidate storage pool configurations of the set, a reliability calculation to determine a reliability value indicating reliability of said each candidate storage pool configuration;

performing, for each of the candidate storage pool configurations of the set, an availability calculation to determine an availability value indicating availability of said each candidate storage pool configuration; and selecting, in accordance with selection criteria, one of the candidate storage pool configurations of the set for a first storage pool, said selection criteria including said availability value and said reliability value for each of said plurality of candidate storage pool configurations, and wherein performing an availability calculation for a first of the candidate storage pool configurations of the set includes determining a first time to restore data for said first candidate pool configuration upon an occurrence of a failure of any RAID group in said first candidate storage pool configuration thereby indicating that the failing RAID group is unable to recover desired data using RAID-group internal rebuild processes, and a second time to rebuild data for a first RAID group in said first candidate storage pool configuration upon an occurrence of an internal RAID group failure of the first RAID group where the first RAID group is able to recover desired data using RAID-group internal rebuild processes for the first RAID group.

15. The method of claim 14, wherein said second time to rebuild is determined in accordance with one or more factors including any of performance characteristics of physical drives of the first candidate storage pool configuration, workload of a data storage system directed to the first RAID group when performing said RAID-group internal rebuild processes for the first RAID group, physical location and/or availability of a spare device used in connection with performing said RAID-group internal rebuild processes for the first RAID group, a service level factor affecting an amount of time to obtain a resource in connection with performing said RAID-group internal rebuild processes, a RAID level and RAID group configuration indicated in the first candidate storage pool configuration of physical drives of the first RAID group, a priority to performing processing of incoming I/O operations over other processing of the RAID-group internal rebuild, and a rate factor related to a rate at which a particular software version is able to perform rebuild processing wherein said rate factor varies with software version.

16. The method of claim 14, wherein said first time to restore is determined in accordance with one or more factors including any of a service level factor affecting an amount of time to obtain a resource in connection with performing data restoration processing to restore data for said first candidate pool configuration, physical location of a backup data set used in connection with performing data restoration processing to restore data for said first candidate pool configuration, a type of data restoration process performed in connection with restoring data for said first candidate pool configuration, and a physical location and/or availability of a spare device.

17. A method of selecting a storage pool configuration comprising:
    determining a set of one or more candidate storage pool configurations,
    performing, for each of the candidate storage pool configurations of the set, a reliability calculation to determine a reliability value indicating reliability of said each candidate storage pool configuration:,
    performing, for each of the candidate storage pool configurations of the set, an availability calculation to determine an availability value indicating availability of said each candidate storage pool configuration; and
    selecting, in accordance with selection criteria, one of the candidate storage pool configurations of the set for a first storage pool, said selection criteria including said availability value and said reliability value for each of said plurality of candidate storage pool configurations, and wherein said reliability calculation and said availability calculation are based on probabilities determined in accordance with a time-dependent model using time-dependent Markov solutions and said first storage pool is a pool used to provision storage for virtually provisioned devices wherein each of said virtually provisioned devices has a capacity and an amount of storage allocated for each virtually provisioned devices at a point in time is less than the capacity.

18. A method of selecting a storage pool configuration comprising:
    determining a set of one or more candidate storage pool configurations;
    performing, for each of the candidate storage pool configurations of the set, a reliability calculation to determine a reliability value indicating reliability of said each candidate storage pool configuration;
    performing, for each of the candidate storage pool configurations of the set, an availability calculation to determine an availability value indicating availability of said each candidate storage pool configuration; and
    selecting, in accordance with selection criteria, one of the candidate storage pool configurations of the set for a first storage pool, said selection criteria including said availability value and said reliability value for each of said plurality of candidate storage pool configurations, and wherein performing a reliability calculation for a first of the candidate storage pool configurations of the set includes determining a time to rebuild data for a first RAID group in said first candidate storage pool configuration upon an occurrence of an internal RAID group failure of the first RAID group where the first RAID group is able to recover desired data using RAID-group internal rebuild processes for the first RAID group and wherein said time to rebuild is determined in accordance with one or more factors including any of performance characteristics of physical drives of the first candidate storage pool configuration, workload of a data storage system directed to the first RAID group when performing said RAID-group internal rebuild processes for the first RAID group, physical location and/or availability of a spare device used in connection with performing said RAID-group internal rebuild processes for the first RAID group, a service level factor affecting an amount of time to obtain a resource in connection with performing said RAID-group internal rebuild processes, and a RAID level and RAID group configuration indicated in the first candidate storage pool configuration of physical drives of the first RAID group.

19. A non-transitory computer readable medium comprising code stored thereon for selecting a configuration for a storage pool, the non-transitory computer readable medium comprising code that, when executed by a processor, performs a method comprising:
    determining a set of one or more candidate storage pool configurations;
    performing, for each of the candidate storage pool configurations of the set, a reliability calculation to determine a reliability value indicating reliability of said each candidate storage pool configuration;
    performing, for each of the candidate storage pool configurations of the set, an availability calculation to determine an availability value indicating availability of said each candidate storage pool configuration; and
    selecting, in accordance with selection criteria, one of the candidate storage pool configurations of the set for a first storage pool, said selection criteria including said availability value and said reliability value for each of said plurality of candidate storage pool configuration, and wherein said selecting further comprises:
    determining that said reliability value for said one candidate storage pool configuration represents a level of storage pool reliability that is greater than an acceptable reliability threshold; and
    determining that said availability value for said one candidate storage pool configuration represents a level of storage pool availability that is greater than an acceptable availability threshold.

* * * * *